United States Patent [19]

Schouhamer Immink

[11] Patent Number: 4,573,034

[45] Date of Patent: Feb. 25, 1986

[54] METHOD OF ENCODING N-BIT INFORMATION WORDS INTO M-BIT CODE WORDS, APPARATUS FOR CARRYING OUT SAID METHOD, METHOD OF DECODING M-BIT CODE WORDS INTO N-BIT INFORMATION WORDS, AND APPARATUS FOR CARRYING OUT SAID METHOD

[75] Inventor: Kornelis A. Schouhamer Immink, Eindhoven, Netherlands

[73] Assignee: U.S. Philips Corporation, New York, N.Y.

[21] Appl. No.: 676,467

[22] Filed: Nov. 29, 1984

[30] Foreign Application Priority Data

Jan. 20, 1984 [NL] Netherlands .......................... 8400187
Aug. 8, 1984 [NL] Netherlands .......................... 8402445

[51] Int. Cl.⁴ ............................................. H03K 13/24
[52] U.S. Cl. ............................................. 340/347 DD
[58] Field of Search ....... 340/347 DD, 347 R, 347 C; 375/25-27

[56] References Cited

U.S. PATENT DOCUMENTS 3,387,366  6/1983  Chow .......................... 340/347 DD
4,387,364  6/1983  Shiroja ........................ 340/347 DD
4,408,189  10/1983  Betts et al. .................. 340/347 DD
4,486,784  12/1984  Abraham et al. ........... 340/347 DD Primary Examiner—Vit W. Miska
Attorney, Agent, or Firm—Thomas A. Briody; William J. Streeter; Edward W. Goodman

[57] ABSTRACT

A method of encoding n-bit information words into m-bit code words and the other way round is described, which code words have a specific disparity d and a digital sum value which is limited to values p and q. In order to enable encoding and decoding without the use of an extensive look-up table, use is made of a series of numbers which is a modified version of numbers in conformity with the Newton binomial. By means of this modified series, the n-bit information words, which are arranged in conformity with their binary weights, are mapped lexicographically and unambiguously onto code words with said limitations, and the other way round.

20 Claims, 31 Drawing Figures

| i | $S_0$ | $S_1$ | i | $S_0$ | $S_1$ | i | $S_0$ | $S_1$ | i | $S_0$ | $S_1$ |
|---|---|---|---|---|---|---|---|---|---|---|---|
| 0 | 171 | 171 | 64 | 589 | 589 | 128 | 619 | 166 | 192 | 921 | 408 |
| 1 | 173 | 173 | 65 | 590 | 590 | 129 | 427 | 169 | 193 | 489 | 417 |
| 2 | 174 | 174 | 66 | 595 | 595 | 130 | 683 | 170 | 194 | 745 | 418 |
| 3 | 179 | 179 | 67 | 597 | 597 | 131 | 811 | 172 | 195 | 873 | 420 |
| 4 | 181 | 181 | 68 | 598 | 598 | 132 | 459 | 177 | 196 | 937 | 424 |
| 5 | 182 | 182 | 69 | 601 | 601 | 133 | 715 | 178 | 197 | 190 | 523 |
| 6 | 185 | 185 | 70 | 602 | 602 | 134 | 843 | 180 | 198 | 318 | 525 |
| 7 | 186 | 186 | 71 | 611 | 611 | 135 | 907 | 184 | 199 | 574 | 526 |
| 8 | 203 | 203 | 72 | 613 | 613 | 136 | 243 | 195 | 200 | 222 | 531 |
| 9 | 205 | 205 | 73 | 614 | 614 | 137 | 371 | 197 | 201 | 350 | 533 |
| 10 | 206 | 206 | 74 | 617 | 617 | 138 | 627 | 198 | 202 | 606 | 534 |
| 11 | 211 | 211 | 75 | 618 | 618 | 139 | 435 | 201 | 203 | 414 | 537 |
| 12 | 213 | 213 | 76 | 651 | 651 | 140 | 691 | 202 | 204 | 670 | 538 |
| 13 | 214 | 214 | 77 | 653 | 653 | 141 | 819 | 204 | 205 | 798 | 540 |
| 14 | 217 | 217 | 78 | 654 | 654 | 142 | 467 | 209 | 206 | 238 | 547 |
| 15 | 218 | 218 | 79 | 659 | 659 | 143 | 723 | 210 | 207 | 366 | 549 |
| 16 | 227 | 227 | 80 | 661 | 661 | 144 | 851 | 212 | 208 | 622 | 550 |
| 17 | 229 | 229 | 81 | 662 | 662 | 145 | 915 | 216 | 209 | 430 | 553 |
| 18 | 230 | 230 | 82 | 665 | 665 | 146 | 483 | 225 | 210 | 686 | 554 |
| 19 | 233 | 233 | 83 | 666 | 666 | 147 | 739 | 226 | 211 | 814 | 556 |
| 20 | 234 | 234 | 84 | 675 | 675 | 148 | 867 | 228 | 212 | 462 | 561 |
| 21 | 299 | 299 | 85 | 677 | 677 | 149 | 931 | 232 | 213 | 718 | 562 |
| 22 | 301 | 301 | 86 | 678 | 678 | 150 | 189 | 267 | 214 | 846 | 564 |
| 23 | 302 | 302 | 87 | 681 | 681 | 151 | 317 | 269 | 215 | 910 | 568 |
| 24 | 307 | 307 | 88 | 682 | 682 | 152 | 573 | 270 | 216 | 246 | 579 |
| 25 | 309 | 309 | 89 | 175 | 43 | 153 | 221 | 275 | 217 | 374 | 581 |
| 26 | 310 | 310 | 90 | 303 | 45 | 154 | 349 | 277 | 218 | 630 | 582 |
| 27 | 313 | 313 | 91 | 559 | 46 | 155 | 605 | 278 | 219 | 438 | 585 |
| 28 | 314 | 314 | 92 | 207 | 51 | 156 | 413 | 281 | 220 | 694 | 586 |
| 29 | 331 | 331 | 93 | 335 | 53 | 157 | 669 | 282 | 221 | 822 | 588 |
| 30 | 333 | 333 | 94 | 591 | 54 | 158 | 797 | 284 | 222 | 470 | 593 |
| 31 | 334 | 334 | 95 | 399 | 57 | 159 | 237 | 291 | 223 | 726 | 594 |
| 32 | 339 | 339 | 96 | 655 | 58 | 160 | 365 | 293 | 224 | 854 | 596 |
| 33 | 341 | 341 | 97 | 783 | 60 | 161 | 621 | 294 | 225 | 918 | 600 |
| 34 | 342 | 342 | 98 | 183 | 75 | 162 | 429 | 297 | 226 | 486 | 609 |
| 35 | 345 | 345 | 99 | 311 | 77 | 163 | 685 | 298 | 227 | 742 | 610 |
| 36 | 346 | 346 | 100 | 567 | 78 | 164 | 813 | 300 | 228 | 870 | 612 |
| 37 | 355 | 355 | 101 | 215 | 83 | 165 | 461 | 305 | 229 | 934 | 616 |
| 38 | 357 | 357 | 102 | 343 | 85 | 166 | 717 | 306 | 230 | 250 | 643 |
| 39 | 358 | 358 | 103 | 599 | 86 | 167 | 845 | 308 | 231 | 378 | 645 |
| 40 | 361 | 361 | 104 | 407 | 89 | 168 | 909 | 312 | 232 | 634 | 646 |
| 41 | 362 | 362 | 105 | 663 | 90 | 169 | 245 | 323 | 233 | 442 | 649 |
| 42 | 395 | 395 | 106 | 791 | 92 | 170 | 373 | 325 | 234 | 698 | 650 |
| 43 | 397 | 397 | 107 | 231 | 99 | 171 | 629 | 326 | 235 | 826 | 652 |
| 44 | 398 | 398 | 108 | 359 | 101 | 172 | 437 | 329 | 236 | 474 | 657 |
| 45 | 403 | 403 | 109 | 615 | 102 | 173 | 693 | 330 | 237 | 730 | 658 |
| 46 | 405 | 405 | 110 | 423 | 105 | 174 | 821 | 332 | 238 | 858 | 660 |
| 47 | 406 | 406 | 111 | 679 | 106 | 175 | 469 | 337 | 239 | 922 | 664 |
| 48 | 409 | 409 | 112 | 807 | 108 | 176 | 725 | 338 | 240 | 490 | 673 |
| 49 | 410 | 410 | 113 | 455 | 113 | 177 | 853 | 340 | 241 | 746 | 674 |
| 50 | 419 | 419 | 114 | 711 | 114 | 178 | 917 | 344 | 242 | 874 | 676 |
| 51 | 421 | 421 | 115 | 839 | 116 | 179 | 485 | 353 | 243 | 938 | 680 |
| 52 | 422 | 422 | 116 | 903 | 120 | 180 | 741 | 354 | 244 | 936 | 87 |
| 53 | 425 | 425 | 117 | 187 | 139 | 181 | 869 | 356 | 245 | 872 | 91 |
| 54 | 426 | 426 | 118 | 315 | 141 | 182 | 933 | 360 | 246 | 744 | 93 |
| 55 | 555 | 555 | 119 | 571 | 142 | 183 | 249 | 387 | 247 | 488 | 94 |
| 56 | 557 | 557 | 120 | 219 | 147 | 184 | 377 | 389 | 248 | 920 | 103 |
| 57 | 558 | 558 | 121 | 347 | 149 | 185 | 633 | 390 | 249 | 856 | 107 |
| 58 | 563 | 563 | 122 | 603 | 150 | 186 | 441 | 393 | 250 | 728 | 109 |
| 59 | 565 | 565 | 123 | 411 | 153 | 187 | 697 | 394 | 251 | 472 | 110 |
| 60 | 566 | 566 | 124 | 667 | 154 | 188 | 825 | 396 | 252 | 824 | 115 |
| 61 | 569 | 569 | 125 | 795 | 156 | 189 | 473 | 401 | 253 | 696 | 117 |
| 62 | 570 | 570 | 126 | 235 | 163 | 190 | 729 | 402 | 254 | 440 | 118 |
| 63 | 587 | 587 | 127 | 363 | 165 | 191 | 857 | 404 | 255 | 632 | 121 |

FIG. 13

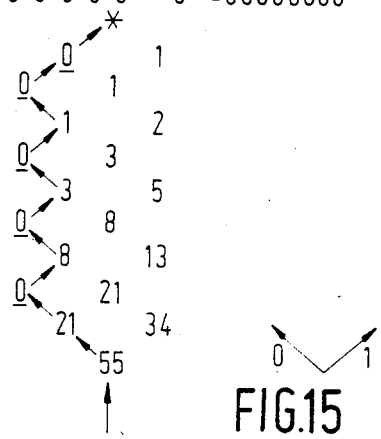
FIG.14
FIG.15
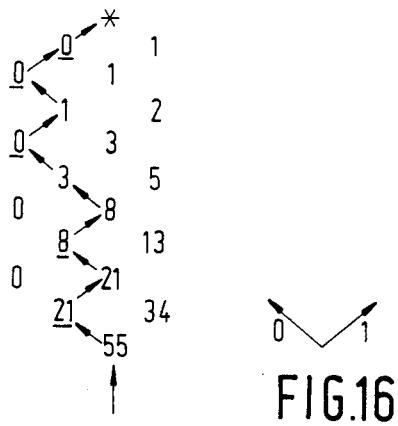
FIG.16
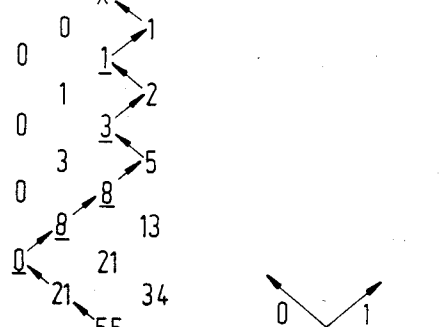
FIG.17
FIG.18
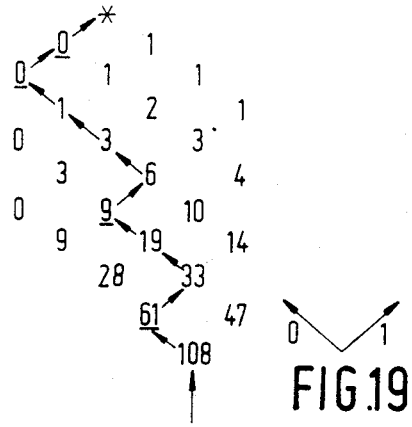
FIG.19

```
k→ 1  2   3   4   5   6  7
r↓         *       *
1       0      1      1
2    0     1      2     (1)
3       1      3      3
4    0     4      6     (3)
5       4     10      9
6    0    14     19     (9)
7      14     33     28
8   (0)   47     61    (28)
9      (47)  108     89
10  (0)   155    197   (89)
```
0↘↙1
FIG.26
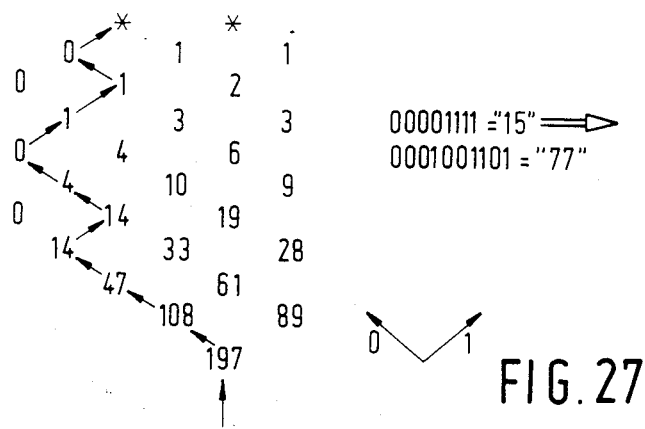
00001111 = "15" ⟹
0001001101 = "77"
0↘↙1
FIG.27
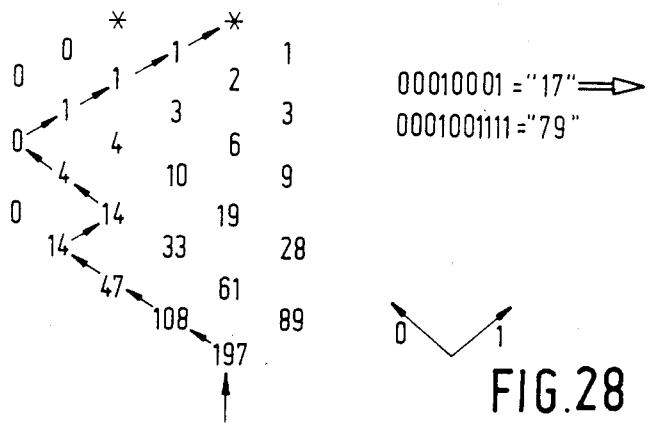
00010001 = "17" ⟹
0001001111 = "79"
0↘↙1
FIG.28

| i | $s_0$ | $s_1$ |
|---|---|---|
| 93 | 625 | 53 |
| 94 | 604 | 54 |
| 97 | 620 | 60 |
| 116 | 433 | 120 |
| 135 | 779 | 184 |
| 145 | 787 | 216 |
| 149 | 803 | 232 |
| 168 | 781 | 312 |
| 178 | 789 | 344 |
| 182 | 805 | 360 |
| 183 | 241 | 387 |
| 192 | 793 | 408 |
| 196 | 809 | 424 |
| 198 | 316 | 525 |
| 199 | 572 | 526 |
| 215 | 782 | 568 |
| 225 | 790 | 600 |
| 229 | 806 | 616 |
| 230 | 242 | 643 |
| 239 | 794 | 664 |
| 243 | 810 | 680 |
| 244 | 376 | 122 |
| 248 | 856 | 107 |
| 249 | 728 | 109 |
| 250 | 472 | 110 |
| 251 | 824 | 115 |
| 252 | 696 | 117 |
| 253 | 440 | 118 |
| 254 | 632 | 121 |
| 255 | 868 | 155 |

FIG. 31

METHOD OF ENCODING N-BIT INFORMATION WORDS INTO M-BIT CODE WORDS, APPARATUS FOR CARRYING OUT SAID METHOD, METHOD OF DECODING M-BIT CODE WORDS INTO N-BIT INFORMATION WORDS, AND APPARATUS FOR CARRYING OUT SAID METHOD

BACKGROUND OF THE INVENTION

The invention relates to a method of encoding n-bit information words, belonging at least to a first group into m-bit code words belonging to a first group, where $m>n$, within which code words the variation of the digital sum value of said code words relative to the initial value of the digital sum value of said code words is limited to a value corresponding to the variation of a first binary value over p bits and a value corresponding to the variation of a second binary value over q bits, where $p \geq 0$ and $q \geq 0$, and which code words exhibit a disparity d, d being an integer within the limits defined by p and q.

In addition, the invention relates to an apparatus for carrying out the method, which apparatus comprises an input for receiving n-bit information words belonging at least to a first group, an output for supplying m-bit code words belonging to a first group, and an encoding device for converting said n-bit information words into m-bit code words in such a way that within said code words, the variation of the digital sum value of said code words relative to the initial value of the digital sum value of said code words is limited to a value corresponding to the variation of a first binary value over p bits and a value corresponding to the variation of a second binary value over q bits, where $p \geq 0$ and $q \geq 0$, and said code words exhibit a disparity d, d being an integer within the limits defined by p and q.

The invention also relates to a method of decoding m-bit code words belonging at least to a first group into n-bit information words belonging to a first group, where $m>n$, within which code words the variation of the digital sum value of said code words relative to the initial value of the digital sum value of said code words is limited to a value corresponding to the variation of a first binary value over p bits and a value corresponding to the variation of a second binary value over q bits, where $p \geq 0$ and $q \geq 0$, and which code words exhibit a disparity d, d being an integer within the limits defined by p and q, and the invention also relates to an apparatus for carrying out the method, which apparatus comprises an input for receiving m-bit code words belonging at least to a first group, an output for supplying n-bit information words belonging to a first group, and a decoding device for converting said m-bit code words into n-bit information words, within which code words the variation of the digital sum value of said code words relative to the initial value of the digital sum value of said words is limited to a value corresponding to the variation of a first binary value over p bits and a value corresponding to the variation of a second binary value over q bits, where $p \geq 0$ and $q \geq 0$, and which code words exhibit a disparity d, d being an integer within the limits defined by p and q.

Such methods and apparatuses are employed for encoding information words into code words with a limited digital sum value as described in inter alia GB-PS No. 1,540,617 and U.S. Pat. No. 4,387,364, and for decoding such code words into information words.

Such encoding and decoding methods can be carried out by the use of memories containing conversion tables (or "look-up tables"), but this demands a substantial storage capacity. However, it is known inter alia from IEEE Transactions on Information Theory, May 1972, pages 395-399, Schalkwijk, and form the same magazine, December 1973, pages 1438-1441 to arrange code words with a specific disparity (−2 in the Schalkwijk method) lexicographically by means of a Pascal triangle whose elements have been selected in conformity with the Newton binomial, so that the information word can be converted directly into the code word and vice versa by merely storing the elements of said Pascal triangle in the memory. This is possible because via said Pascal triangle sequence numbers are assigned to all the output code words with said disparity. As the sequence numbers form an uninterrupted sequence, an unambiguous code conversion is possible by relating the n-bit input words to said sequence numbers in conformity with their binary weights. However, if, in the same way as the code words of the type defined in the opening paragraph, not all the words with said disparity d are permissible as a result of a limitation of the maximum excursion of the digital sum value within the code words to the limits p and q, this known encoding and decoding method cannot be used. Indeed, some code words of the series of n-bit code words to which sequence numbers have been assigned via the Pascal triangle, are not permissible. Therefore, it is not possible to assign an uninterrupted series of sequence numbers to the permissible code words by means of the Pascal triangle, so that the n-bit information words cannot be mapped onto the m-bit code words, or the other way around, in conformity with their sequence numbers as defined by their binary weights via the Pascal triangle.

SUMMARY OF THE INVENTION

The invention aims at providing encoding and decoding methods and apparatuses which enable such a mapping by means of a modified Pascal triangle. The invention relates to a method of encoding, an apparatus for carrying out the encoding method, a method of decoding and an apparatus for carrying out the decoding method.

To this end the method of encoding n-bit information words belonging at least to a first group into m-bit code words belonging to a first group, where $m>n$, within which code words the variation of the digital sum value of said code words relative to the initial value of the digital sum value of said code words is limited to a value corresponding to the variation of a first binary value over p bits and a value corresponding to the variation of a second binary value over q bits, where $p \geq 0$ and $q \geq 0$, and which code words exhibit a disparity d, d being an integer within the limits defined by p and q, is characterized in that said code words are found by the use of a series of encoding numbers which correspond unambiguously to the information words of the first group and of numbers $x_{k,r}$ which can be found by arranging said numbers in a matrix, k being a sequence number for the columns ranging from 1 to $p+q+1$, inclusive, and r being a sequence number for the rows ranging from 1 to m, inclusive, which matrix can be formed by entering the value 1 in the 1st row and the $(p+d+2)$nd column $(x_{p+2+d,\ 1}=1)$ filling the 1st column with the value 0 $(x_{1,r}=0)$, and adding an auxiliary column with the sequence number $p+q+2$ and filling said auxiliary column with the value in the column $p+q+1$ in the row of next lower sequence number ($x_{p+q+2, r} = x_{p+q+1, r-1}$) and filling the other relevant positions with the sum of the values in the adjacent columns in the row of next lower sequence number ($xkr = x_{k-1, r-1} + x_{k+1, r-1}$), with the proviso that the vacant positions at the first row are assumed to be filled with a value zero, all values on the diagonal which extends from the number $x_{p+1, m}$ to the number $x_{1, m-p}$ being modifiable by the same constant value, in which, starting from a number $x_{k,r}$ with a row sequence number $r = m$ and with a column sequence number $k = p+1$ and starting from an initial value of an auxiliary number A, which initial value corresponds to the encoding number associated with the information word to be encoded of the first group, said auxiliary number is compared with the number $x_{k,r}$ with the instantaneous row sequence number r and column sequence number k to modify said auxiliary number if said number $x_{k,r}$ is smaller than or equal to the auxiliary number A, by subtracting said number $x_{k,r}$ ($A := A - x_{k,r}$), to generate one bit of the second binary value, and to select a following number $x_{k,r}$ with a row sequence number decremented by one ($r := r-1$) and a column sequence number incremented by one ($k := k+1$), and to leave said auxiliary number unmodified if said number $x_{k,r}$ is larger than the auxiliary number, to generate one bit of the first binary value and to select a following number $x_{k,r}$ with a row sequence number decremented by one ($r := r-1$) and a column sequence number decremented by one ($k := k-1$), until finally the row sequence number $r = 1$ is reached, after which a bit of the second binary value is generated if the auxiliary number is zero and a bit of a first binary value if the auxiliary number is one, the m bits generated for each information word constituting the code word.

The apparatus for carrying out the method, which apparatus comprises an input for receiving n-bit information words belonging at least to a first group, an output for supplying m-bit code words belonging to a first group, and an encoding device for converting said n-bit information words into m-bit code words in such a way that within said code words the variation of the digital sum value of said code words relative to the initial value of the digital sum value of said code words is limited to a value corresponding to the variation of a first binary value over p bits and a value corresponding to the variation of a second binary value over q bits, where $p \geq 0$ and $q \geq 0$, and said code words exhibit a disparity d, d being an integer within the limits defined by p and q, is characterized in that the encoding device comprising storage means for storing numbers $x_{k,r}$ which can be found by arranging said numbers in a matrix, where k is a sequence number for the columns ranging from 1 to $p+q+1$, inclusive, and r is a sequence number for the rows ranging from 1 to m, inclusive, which matrix can be formed by entering the value 1 in the 1st row and the $(p+d+2)$nd column, filling the 1st column with the values 9, and adding an auxiliary column with the sequence number $p+q+2$ and filling said auxiliary column with the value in the column $p+q+1$ in the row of the next lower sequence number, and filling the other relevant positions with the sum of the values in the adjacent columns in the row of next lower sequence number, with the proviso that the vacant positions at the first row are assumed to be filled with a value zero, all values on the diagonal which extends from the number $x_{p+1, m}$ to the number $x_{1, m-p}$ being modifiable by the same constant value, means for generating an initial value of an auxiliary number A, which initial value corresponds to an encoding number which corresponds unambiguously to the information word to be converted, addressing means for addressing the storage means in order to read out a number $x_{k,r}$, the initial address for encoding every following information word being the address associated with the number $x_{p+1, m}$, comparator means for comparing the auxiliary number with the number $x_{k,r}$ which has been read out, means for generating an output bit of the second binary value if said number $x_{k,r}$ is smaller than or equal to the auxiliary number A and for generating an output bit of the first binary value if said number $x_{k,r}$ is larger than the auxiliary number A, means for decrementing the auxiliary number A by the number $x_{k,r}$ read out each time that the number $x_{k,r}$ is smaller than or equal to said auxiliary number A, means for setting the addressing means in such a way that a following number $x_{k,r}$ with a row sequence number decremented by one and a column sequence decremented by one is addressed each time that the number $x_{k,r}$ read out is larger than the auxiliary number A and that a following number $x_{k,r}$ with a row sequence number decremented by one and a column sequence number incremented by one is addressed each time that the number $x_{k,r}$ read out is smaller than or equal to the auxiliary number A, and means for supplying the m output bits thus obtained for every n-bit information word to be converted to the output.

The method of decoding m-bit code words belonging at least to a first group into n-bit information words belonging to a first group, where $m > n$, within which code words the variation of the digital sum value of said code words relative to the initial value of the digital sum value of said code words is limited to a value corresponding to the variation of a first binary value over p bits and a value corresponding to the variation of a second binary value over q bits, where $p \geq 0$ and $q \geq 0$ and which code words exhibit a disparity d, d being an integer within the limits defined by p and q, is characterized in that the information words correspond unambiguously to a series of decoding numbers, which decoding numbers are derived from the code words to be decoded by means of numbers $x_{k,r}$ which can be found by arranging said numbers in a matrix, k being a sequence number for the columns ranging from 1 to $p+q+1$, inclusive, and r being a sequence number for the rows ranging from 1 to m, inclusive, which matrix can be formed by entering the value 1 in the 1st row and the $(p+d+2)$nd column ($x_{p+2+d, 1} = 1$) filling the 1st column with the values 0 ($x_{1, r} = 0$), and adding an auxiliary column with the sequence number $p+q+2$ and filling said auxiliary column with the value in the column $p+q+1$ in the row of next lower sequence number ($x_{p+q+2, r} = x_{p+q+1, r-1}$) and filling the other relevant positions with the sum of the values in the adjacent columns in the row of next lower sequence number ($x_{k,r} = x_{k-1, r-1} + x_{k+1, r-1}$), with the proviso that the vacant positions at the first row are assumed to be filled with a value zero, the values on the matrix diagonals which extend towards the row of next lower sequence number and the column of next lower sequence number being modifiable by the same constant value for each diagonal, the decoding number associated with the code word to be decoded being found, starting from a number $x_{k,r}$ with the row sequence number $r = m$ and the column sequence number $k = p+1$, by modifying an auxiliary number A of predetermined constant initial value, each time that a bit of the second binary value of the code word to be converted is received by adding the number $x_{k,r}$ ($A:=A+x_{k,r}$) and selecting a following number $x_{k,r}$ with a row sequence number decremented by one ($r:=r-1$) and a column sequence number incremented by one ($k:=k+1$) and, each time that a bit of the first binary value of the code word to be converted is received leaving the auxiliary number unmodified and selecting a following number $x_{k,r}$ with a row sequence number decremented by one ($r:=r-1$) and a column sequence number decremented by one ($K:=k-1$), the decoding number being constituted by the remaining auxiliary number after receipt of the entire code word.

The apparatus for carrying out the method, which apparatus comprises an input for receiving m-bit code words belonging at least to a first group, an output for supplying n-bit information words belonging to a first group, and a decoding device for converting said m-bit code words into n-bit information words, within which code words the variation of the digital sum value of said code words relative to the initial value of the digital sum value of said code words is limited to a value corresponding to the variation of a first binary value over p bits and a value corresponding to the variation of a second binary value over q bits where $p \geq 0$ and $q \geq 0$, and which code words exhibit a disparity d, d being an integer within the limits defined by p and q, is characterized in that the decoding device comprises storage means for the storage of numbers $x_{k,r}$ which can be found by arranging said numbers in a matrix, where k is a sequence number for the columns ranging from 1 to $p+q+1$, inclusive, and r is a sequence number for the rows ranging from 1 to m, inclusive, which matrix can be formed by entering the value 1 in the 1st row and the $(p+d+2)$nd column, filling the 1st column with the values 0 and adding an auxiliary column with the sequence number $p+q+2$ and filling said auxiliary column with the value in the column $p+q+1$ in the row of next lower sequence number and filling the other relevant positions with the sum of the values in the adjacent columns in the row of next lower sequence number, with the proviso that the vacant positions at the first row are assumed to be filled with a value zero, the numbers on the matrix diagonals which extend towards the row of next lower sequence number and the column of next lower sequence number being modifiable by the same constant value for each diagonal, means for generating an initial value of an auxiliary number A, addressing means for addressing the storage means in order to read out a number $x_{k,r}$ using the address associated with the number $x_{p+1, m}$ as the initial address for decoding every following code word, means for incrementing the auxiliary number A by the number $x_{k,r}$ read out each time that a bit of the second binary value is received, means for setting the addressing means in such a way that a following number $x_{k,r}$ with a row sequence number decremented by one and a column sequence number decremented by one is addressed each time that a bit of the first binary value is received, in such a way that a following number $x_{k,r}$ with a row sequence number decremented by one and a column sequence number incremented by one is addressed each time that a bit of the second binary value is received and means for supplying an information word each time that a code word is received in such a way that an information word is assigned unambiguously to each final value of the auxiliary number.

In order to enable all the n-bit information words, to be encoded into m-bit code words it may happen that a plurality of groups of code words of different disparity have to be admitted. To find all these code words with one and the same modified Pascal triangle, a method is used in which n-bit information words belonging to a second group are encoded into m-bit code words belonging to a second group, the variation of the digital sum value of said code words of the second group also being restricted to the limits defined by the integers p and q, which code words exhibit a disparity e which differs from d, e being an integer within the limits defined by p and q, is characterized in that the information words of the second group also correspond unambiguously to numbers of said series of encoding numbers and the code words belonging to the first and the second group are found by means of said numbers $x_{k,r}$, with the proviso that the numbers $x_{k,r}$ are found in the manner defined with a value 1 at said first row in the $(p+e+2)$nd column in addition to a value 1 at the first row in the $(p+d+2)$nd column.

An apparatus in which n-bit information words belonging to a second group are encoded into m-bit code words belonging to a second group, the variation of the digital sum value of said code words of the second group also being restricted to the limits defined by the integers p and q, which code words exhibit a disparity e which differs from d, e being an integer within the limits defined by p and q, is characterized in that numbers $x_{k,r}$ stored in the storage means are found in the manner defined, with a value 1 at the first row in the $(p+e+2)$nd column in addition to a value 1 at said first row in the $(p+d+2)$nd column.

A method by means of which m-bit code words belonging to a second group are decoded into n-bit information words belonging to a second group, the variation of the digital sum value of said code words of the second group being also restricted to the limits defined by the integers p and q, which code words exhibit a disparity e which differs from d, e being an integer within the limits defined by p and q, is characterized in that the information words of the second group also correspond unambiguously to numbers of said series of decoding numbers and for generating an information used in the manner defined when a code word of the first or the second group is received use is made of said numbers $x_{k,r}$, with the proviso that the numbers $x_{k,r}$ are found in the manner defined, with a value 1 at said first row in the $(p+e+2)$nd column in addition to a value 1 at said first row in the $(p+d+2)$nd column.

An apparatus by means of which m-bit code words belonging to a second group are encoded into n-bit information words belonging to a second group, the variation of the digital sum value of said code words of the second group being also restricted to the limits defined by the integers p and q, which code words exhibit a disparity e which differs from d, e being an integer within the limits defined by p and q, is characterized in that numbers $x_{k,r}$ stored in the storage means are found in the manner defined with a value 1 at the first row in the $(p+e+2)$nd column in addition to a value 1 at said first row in the $(p+d+2)$nd column.

The encoding method may be characterized further in that the encoding numbers correspond to the binary values of the associated information words.

The apparatus for carrying out said encoding method may be characterized further in that the means for generating the initial value of the auxiliary number A are adapted to generate said initial value in relation to the binary value of the information word to be converted.

The decoding method may be characterized further in that the decoding numbers correspond to the binary values of the associated information word.

The apparatus for carrying out the decoding method may be characterized further in that the means for supplying the information words A are adapted to generate information words of a binary value corresponding to the said final value.

The said method of finding a plurality of groups of code words by means of the same modified Pascal triangle can be employed only if the same limits p and q are imposed on the digital sum value for said groups. If this is not possible, a variant may be used, in which case the encoding method may be characterized further in that the encoding numbers correspond to the binary values of the associated information words, which encoding numbers are all larger than or equal to a number B, B being an integer larger than zero, all numbers $x_{k,r}$ corresponding to the diagonal of the matrix defined, which diagonal extends from the number $x_{p+1,m}$ to the number $x_{1,m-p}$, have been incremented by an amount B in comparison with the values which are found by filling the matrix in the manner defined, and a second series of encoding numbers is assigned to a second group of n-bit information words to be converted into a second group of m-bit code words in a manner similar to the conversion of the information words of the first group, which encoding numbers correspond to the binary values of the associated information words of said second group and are all smaller than said number B.

The apparatus for carrying out said variant may be characterized further in that the means for generating the initial value of the auxiliary number A are adapted to generate said initial value in relation to the binary value of the information word to be converted, which binary values are all larger than or equal to a number B, B being an integer larger than zero, the numbers $x_{k,r}$ in the storage means which correspond to the diagonal of the matrix defined, which diagonal extends from the number $x_{p+1,m}$ to the number $x_{1,m-p}$ is incremented by an amount B in comparison with the values found by filling the matrix in the manner defined, and a second series of encoding numbers is assigned to a second group of n-bit information words to be converted into a second group of m-bit code words in the same way as the conversion of the information words of the first group, which encoding numbers are generated by the means for generating the initial values of the auxiliary number A in relation to the binary values of said information words of a second group, which values are all smaller than said number B, the storage means containing a second group of numbers $x_{k,r}$ which can be found in the manner defined, and the apparatus comprising identification means for detecting whether the information words received belong to the first group or to the second group.

The decoding method may be characterized further in that the decoding numbers correspond to the binary values of the associated information words, which decoding numbers are all larger than or equal to a number B, B being an integer larger than zero, all numbers $x_{k,r}$ on one or more diagonals of the matrix defined which extend towards the row of next lower sequence number and the column of next lower sequence number, from the diagonal which extends via the number $x_{p+1,m}$ up to and including the diagonal which extends via the number $x_{p+d+1,0}$, are incremented by such an amount in comparison with the value found by filling the matrix in the manner defined that the sum of the diagonally applied increments is equal to the number B, and a second series of decoding numbers is assigned to a second group of m-bit code words to be converted into a second group of n-bit information words in a manner similar to the conversion of the code words of the first group, which decoding numbers correspond to the binary values of the associated information words of said second group and are all smaller than said number B.

The apparatus for carrying out said decoding method may be characterized in that the means for supplying the information words are adapted to generate information words of the second group with a binary value corresponding to said final value, which binary values are all larger than or equal to a number B, B being an integer larger than zero, for which purpose all numbers $x_{k,r}$ on one or more diagonals of the matrix defined which extend towards the row of next lower sequence number and the column of next lower sequence number, from the diagonal which extends from the number $x_{p+1,m}$ up to and including the diagonal which extends via the number $x_{p+d+1,0}$ are incremented, relative to the values found by filling the matrix in the manner defined, by such an amount that the sum of the diagonally applied increments is equal to the number B, for generating information words of the first group the storage means contain a second group of numbers $x_{k,r}$ which can be found in the manner defined and the apparatus comprises identification means for detecting whether a code word received must be decoded into an information word of the first group or the second group.

An alternative to this variant of the encoding method may be characterized further in that the encoding numbers correspond to the binary values of the associated information words, which encoding numbers are all larger than or equal to a number B, B being an integer larger than zero, the initial value of the auxiliary number A corresponds to the value of the encoding number associated with the information word to be converted minus the number B, and a second series of encoding numbers is assigned to a second group of n-bit information words to be converted into a second group of m-bit code words in a manner similar to the conversion of the information words of the first group, which encoding numbers correspond to the binary values of the associated information words of said second group and are all smaller than said number B.

The apparatus for carrying out this encoding method may be characterized in that the means for generating the initial value of the auxiliary number A are adapted to generate said initial value in relation to the binary value of the information word to be converted, which binary values are all higher than or equal to a number B, B being an integer larger than zero, decremented by said number B, a second series of encoding numbers being assigned to a second group of n-bit information words to be converted into a second group of m-bit code words in a manner similar to the conversion of the information words of the first group and the means for generating said initial value being adapted to generate said initial value in relation to the binary value of the information word received if this word belongs to the second group, which apparatus comprises identification means for detecting whether the information words received belong to the first or to the second group.

The decoding method may be characterized further in that the decoding numbers correspond to the binary values of the associated information words, which decoding numbers are also larger than or equal to a number B, B being an integer larger than zero, said auxiliary number which remains after the entire code word to be converted has been received, is incremented by an amount B to generate the associated decoding number, and a second series of decoding numbers is assigned to a second group of n-bit information words to be obtained by decoding a second group of m-bit code words in a manner similar to the decoding of the code words of the first group, which decoding numbers correspond to the binary values of the associated information words of said second group and are all smaller than said number B.

The apparatus for carrying out this decoding method may be characterized in that the means for supplying information words are adapted to supply information words of a second group of a binary value larger than or equal to B, B being an integer larger than zero, said final value is incremented by an amount equal to the number B, and said binary value of the information word to be supplied is selected in conformity with said incremented final value, the first group of information words being supplies in conformity with the non-incremented final value, and the apparatus comprises identification means for detecting whether a code word received must be decoded into an information word of the first group or the second group.

DESCRIPTION OF THE DRAWINGS

The invention will now be described in more detail, by way of example, with reference to the drawings in which:

FIG. 13 is a table of code words;

FIGS. 14 to 19 show a number of modified Pascal triangles to explain an encoding and decoding method;

FIGS. 26 to 28 show a number of modified Pascal triangles to explain the encoding and decoding of all the code words by means of one modified Pascal triangle;

FIG. 31 is a modification to the table shown in FIG. 13.

DESCRIPTION OF THE PREFERRED EMBODIMENT

Figure 1:
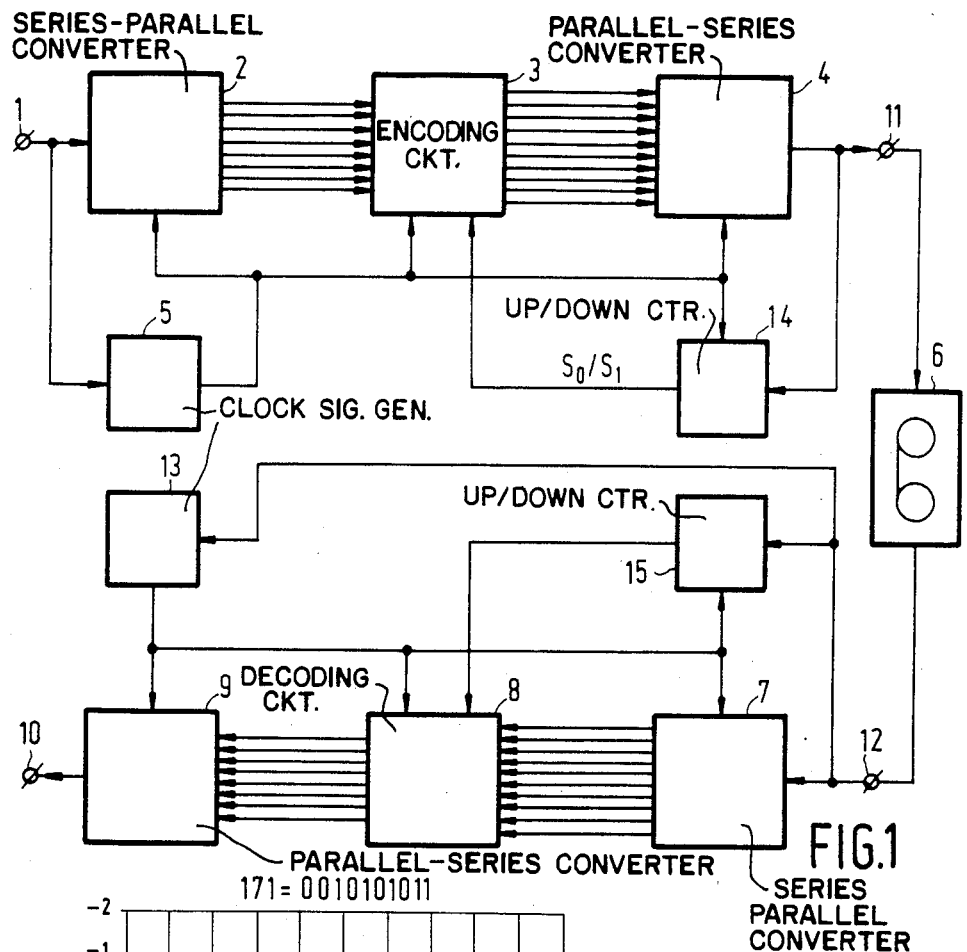
FIG. 1 shows an apparatus using the method of encoding and decoding digital data in order to keep the digital sum value of the encoded signal within specific limits.

FIG. 1 shows an apparatus employing a system of encoding and decoding digital data in such a way that the digital sum value of the encoded signal remains within specific limits. The apparatus comprises an input 1 for receiving serial input data (unless the data is already available in parallel form) and a series-to-parallel converter 2 for arranging the data as parallel words, in the present example 8-bit parallel words. These 8-bit words are applied to an encoding circuit 3, for example in the form of a look-up table which, in the present case, generates a 10-bit output word for every input word in conformity with the rules for which said circuit has been laid out. These 10-bit words are converted into a serial data sequence by means of a parallel-to-series converter 4, which data sequence is, for example, recorded on a magnetic tape by means of a conventional analog magnetic tape recorder 6. It is possible, for example, to record a plurality of parallel tracks, for example 20. The process is synchronized by clock signals which are derived from the input signal by means of a clock-signal generator circuit 5.

In principle, decoding is possible by means of the same circuit operated in the reverse sequence. The signal from the tape recorder 6 is converted into 10-bit words by means of a series-to-parallel converter 7 (unless the data is already available in the form of 10-bit words). Using rules which are complementary to those employed for encoding, these 10-bit words are converted into 8-bit words by means of a decoding circuit 8, which words are subsequently converted into a serial data stream on output 10 by means of a parallel-to-series converter 9. This process is again synchronized by clock signals obtained by means of the clock-signal generator circuit 13, said clock signals being derived from the signals from the recorder 6 which appear on input 12 of the series-to-parallel converter 7.

In order to limit the digital sum value, it is in principle possible to admit only code words with equal numbers of ones and zeros, i.e. code words which, in their totality, do not affect the digital sum value. In particular, if limits are also imposed on the digital sum values within the code word, the number of code words which can be formed with a specific number of bits, in the present example 10, is so small that this limited number of code words with said number of bits can be decoded only into input words with a substantially smaller number of bits, resulting in a substantial reduction in channel capacity. If this loss of capacity is to be minimized, for example as in the case of a conversion from 8 into 10 bits, code words with unequal numbers of zeros and ones, i.e. with a digital-sum-value variation or a disparity unequal to zero, should be allowed, as has been proposed in GB-PS No. 1540617. In this patent specification, it has been proposed to admit words with a minimum disparity unequal to zero, in particular ±2, for code words comprising an even number of bits and to assign an output word with a disparity +2 and a disparity −2 to every input word and to select that word which reduces the digital sum value, i.e. the integral of the disparities of all the preceding words. In the apparatus shown in FIG. 1, this is achieved by determining the digital sum value of all the preceding words by means of an up/down counter 14 which counts down for every logic zero and which counts up for every logic one, and by generating a logic signal $S_0/S_1$ depending on this count which signal indicates whether said digital sum value exhibits a high ($S_1$) or a low ($S_0$) value of two possible values. In the case of a low value $S_0$, the next input word is converted into a word of zero or +2 disparity in conformity with the obtaining rules or look-up tables, so that the digital sum value remains $S_0$ or becomes $S_1$ ($S_1=S_0+2$), respectively, and in the case of a high value $S_1$, said input word is converted into a word of zero or $-2$ disparity so that the dignal zum value remains $S_1$ or becomes $S_0$ ($S_0=S_1-2$), respectively.

During decoding the digital sum value of all the words read out previously is determined by means of the up/down counter 15 and depending on this, it is determined whether a word of 0 or $+2$ disparity or conversely, a word of a 0 or $-2$ disparity has been selected as the next code word during encoding. The decoding circuit 8 is controlled in conformity with this. Thus, by means of rules or look-up tables, both the encoding circuit 3 and the decoding circuit 4 provide a set of code words $S_0$ which is valid if the digital sum value of all the preceding words is $S_0$ and a set $S_1$ which is valid if the digital sum value of all the preceding words is $S_1$.

In accordance with the afore-mentioned British Patent Specification, the one set $S_1$ can be derived simply from the other set $S_0$ if the words of 0 disparity are selected to be identical to, and words of $-2$ disparity are selected to be complementary to the words of $+2$ disparity.

The choice of the code words will be explained with reference to FIGS. 2 to 12 which show diagrams which given the instantaneous digital sum values of a code word as a function of the bit number. The words are 10-bit code words with the most significant bits at position 1. The digital sum values, which ranges from $+3$ to $-2$, has been plotted vertically. Thus, six digital sum values are possible. The code words are given both in binary representation and in decimal representation.

Figure 2:
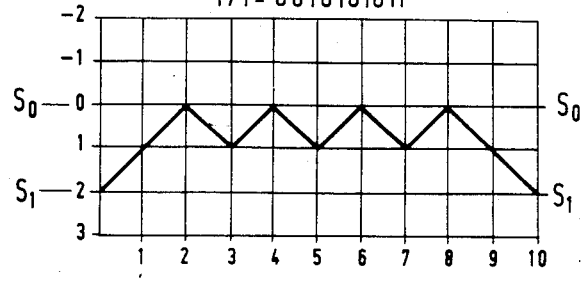
FIGS. 2 to 12 inclusive show a number of Trellis diagrams to explain the choice of the code words.
Figure 3:
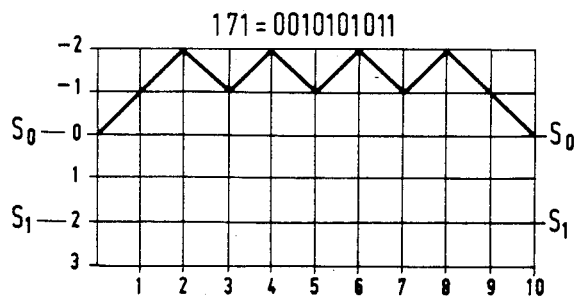

FIG. 2 shows the digital-sum-value variation of a code word of zero disparity, the digital sum value preceding said code word being $S_1$. By way of example, the code word 171=0010101011 has been selected. Every 1 increments the digital sum value by one and every 0 decrements the digital sum value by one. The relevant code word starts with a value $S_1$ and ends with a value $S_1$, remaining within the specified digital sum value limits $+3$ and $-2$. FIG. 3 shows the same code word beginning with a value $S_0$. The variation then also remains within the specified limits $-2$ and $+3$.

Figure 4:
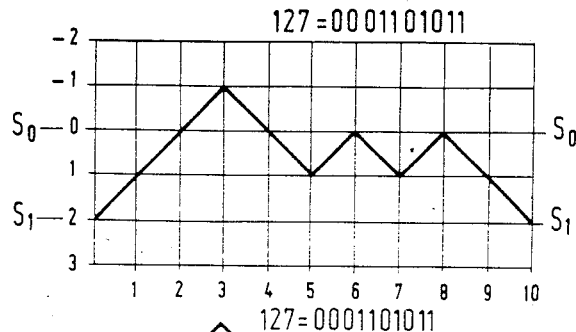
Figure 5:
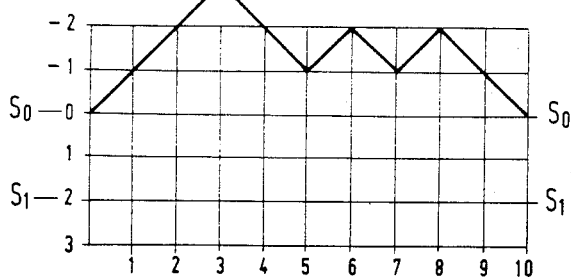

FIG. 4 shows the variation of the code word 127=0001101011 starting from a digital sum value $S_1$. This word remains within the limits $-3$ and $+2$. However, if this word starts with a digital sum value $S_0$, as shown in FIG. 5, this word will not remain within the specified limits. The word 127, therefore, does not belong to the group of words of zero disparity which remains within the specified limts. It is evident that only those words of zero disparity which remains within the specified digital-sum-value limits regardless of the initial situation ($S_0$ or $S_1$) all have a digital-sum-value variation which, starting from the initial value, remains between $+1$ and $-2$.

Figure 6:
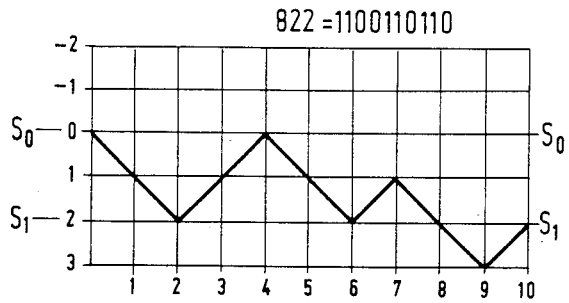
Figure 7:
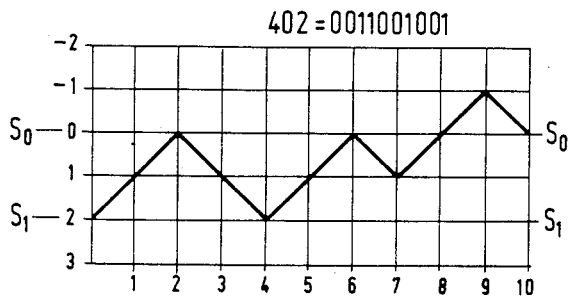

FIG. 6 shows the variation of the digital sum value of the word 822=1100110110 of $-2$ disparity, i.e. it appears only in the case of an initial state $S_0$. This word remains within the specified limits. Should the initial state $S_1$ be required, the inverse code word would have to be selected in accordance with the afore-mentioned British patent specification, namely the word 402=0011001001, whose digital-sum-value variation, as shown in FIG. 7, also remains within the specified limits.

Figure 8:
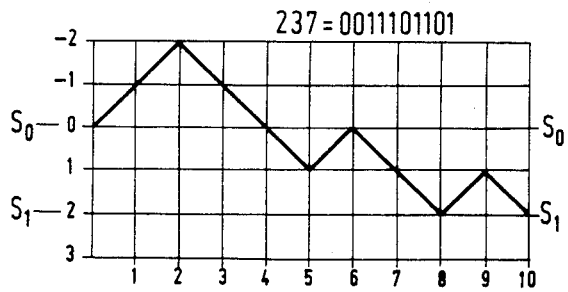
Figure 9:
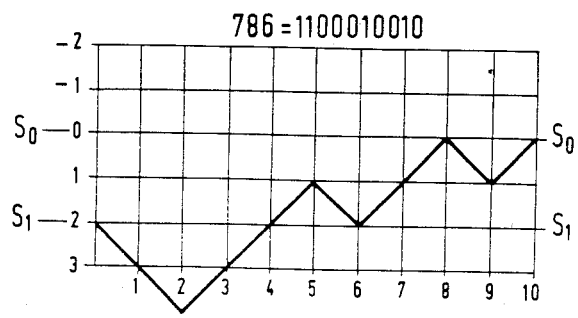
Figure 10:
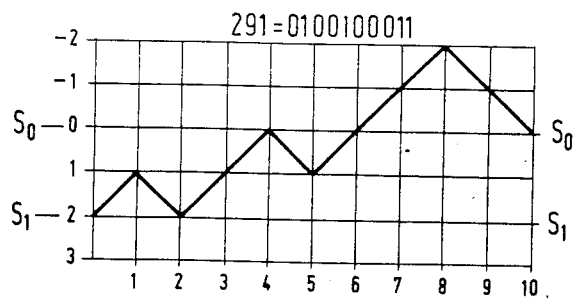

FIG. 8 shows the variation of the word 237=0011101101 of $-1$ disparity, which variation remains within the specified limits. However, if this word is inverted in the initial state $S_1$, this results in the word 786=1100010010 which, as is shown in FIG. 9, does not remain within the specified limits. This means that not all words of $-2$ disparity which remain within the specified limits can be used when the inversion technique is employed, because some of these words are no longer permissible after inversion. A solution to this is not only to invert the word but also to reverse it, i.e. to reverse the transmission sequence. The word then becomes 291=0100100011 whose variation remains within the specified limits, as is shown in FIG. 10. A comparison of FIGS. 8 and 10 shows that an inversion plus reversal is in effect a mirror-inversion of the diagram about the vertical axis halfway the word. It follows that each word of $-2$ disparity which remains within the specified limits from the initial value $S_1$ also remains within the specified limits after inversion, yielding $+2$ disparity, and reversal from the initial state $S_1$. Thus, all words of $-2$ disparity may be used, enabling the coding to be optimized as regards loss of channel capacity or limitation of the instantaneous digital-sum-value variation (up to 6 values in the present example).

The foregoing results in two groups of code words:
Group $T_0$: all code words of 0 disparity which remain within the specified limits regardless of the initial state,
Group $T_1$: all the code words of $+2$ disparity which depend on the initial state and which can be derived from each other by inversion and reversal, the words corresponding to the initial state $S_0$ having $+2$ disparity and the words corresponding to an initial state $S_0$ having $-2$ disparity.

It is to be noted that, in principle, it is possible to invert as well as reverse only those words with a disparity $+2$ which reach the value $-2$ when going from state $S_0$ to state $S_1$ and which consequently reach said value $-2$ after reversal and inversion going from the state $S_1$ to the state $S_0$. Thus, three groups are obtained; the group $T_0$, the group $T_1$, which is limited to those words of $\pm 2$ disparity which reach the level $-2$ and which can thus be identified, and the group $T_1'$, which is limited to those words of $\pm 2$ disparity which do not reach the level $-2$ (for example, the word 822 in FIG. 6).

If only words of groups $T_0$ and $T_1$ (and as the case may be the group $T_1'$) occur, decoding is possible regardless of what happened previously. Indeed, the disparity of the word itself is indicative of the decoding rule: disparity $+2$ means decoding from the initial state $S_0$; disparity $-2$ means decoding from the initial state $S_1$, and disparity 0 means decoding regardless of the initial state. The up/down counter 15 (FIG. 1) merely serves to determine the disparity of the word received. This does not give rise to error propagation when an erroneous initial state is detected. Indeed, the initial state of each word is determined independently of its history. It is then possible to incorporate one table in the decoding circuit, for example the table corresponding to the initial state $S_0$, the words being converted after inversion and reversal when the disparity is $-2$ and directly when the disparity is $+2$ or 0.

Figure 11:
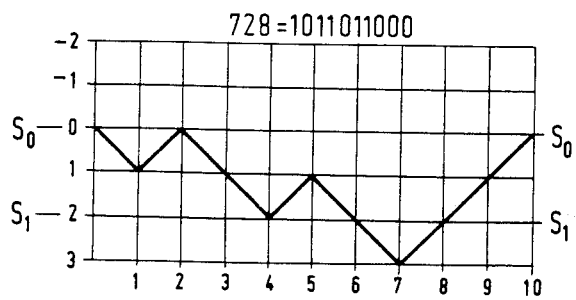
Figure 12:
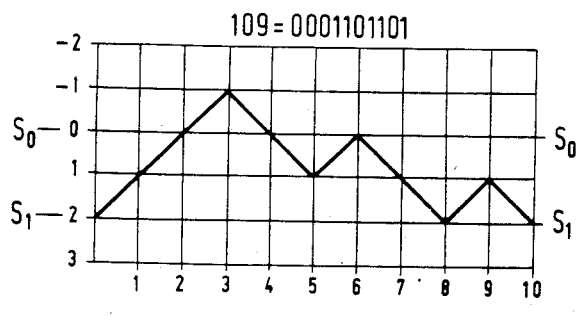

It may happen, as in the case of the 8-to-10 conversion described in the foregoing, that the number of code words which can be found in accordance with the above rules is inadequate for the specified limits. In the case of an 8-to-10 conversion, 256 different (8-bit) input words are possible, for each of which a 10-bit output word must be selected. The group $T_0$ comprises 89 code words and the group $T_1$ comprises 155 code words, so that there is a discrepancy of 12 code words. These words may then be selected from these words of 0 disparity which are possible from one of the two initial states $S_0$ and $S_1$ but not from the other state. It is then possible to choose from the group of words which begin with three logic zeros from the initial state $S_1$ and which are formed by reversal (without inversion !) from a group of words which end with three zeros from the initial state $S_0$. FIG. 11 shows an example of such a word ending with three zeros (initial state $S_0$) and FIG. 12 shows an example of the word after reversal (initial state $S_1$). During decoding, the initial state can be determined simply from the fact that the word begins (initial state $S_1$) or ends (initial state $S_0$) with three zeros while the disparity is zero. FIG. 13 is a table giving the 256 8-bit input words i and the associated 10-bit output words in both the state $S_0$ and the state $S_1$ in decimal notation. The first group $T_0$ is formed by the input words $0 \leq i \leq 88$, the second group $T_1$ by the input words $89 \leq i \leq 243$, and the third group $T_2$ by the words $244 \leq i \leq 255$.

The conversion of 8-bit input words into 10-bit output words can be effected by storing the table of FIG. 13, if necessary limited to one of the two states $S_0$ or $S_1$, in a memory, but this may present problems in view of the required storage capacity. However, it is known, inter alia from IEEE Transactions on Information Theory, May 1972, pages 395-399, Schalkwijk, and from the same magazine, December 1973, pages 1438-1441 to, arrange code words of a specific disparity ($=2$ in the Schalkwijk method) lexicographically by means of a Pascal triangle whose elements have been selected in conformity with the Newton binomial, so that the input code word can be converted directly into the output code word and vice versa by storing only the elements of said Pascal triangle. Via this Pascal triangle, a sequence number is assigned to all the output code words with said disparity. The series of sequence numbers is uninterrupted, so that an unambiguous code word conversion can be obtained by relating the 8-bit input words to the sequence numbers in conformity with their binary weights. However, if, as in the present case, not all the words with this disparity are permissible owing to a limitation of the maximum excursion of the digital sum value within the code word in conformity with the diagram shown in FIGS. 1 to 10, this encoding and decoding method is not possible. Indeed, some of the words of the series of 10-bit output code words to which sequence numbers have been assigned via the Pascal triangle, are not permissible. Therefore, the permissible 10-bit code words cannot be provided with an uninterrupted series of sequence numbers by means of the Pascal triangle, so that the 8-bit input words cannot be mapped onto the 10-bit output code words in conformity with their sequence numbers, which depend on their binary weights, via the Pascal triangle, or the other way round. However, if a modified Pascal triangle is used in conformity with the rules described with reference to FIG. 14, this is found to be possible again.

FIG. 14 shows an example of such a modified Pascal triangle obtained in conformity with the following general rules:

(1) Select as many columns k as there are possible digital-sum-value levels within the permissible group of code words. In the present example $k=4$ in conformity with the number of levels within the group $T_0$ (four levels are possible both from $S_1$ and from $S_0$). Add one auxiliary column (5th column).

(2) Select as many rows r as there are bits in the output word. In the present example $r=10$ because of the 8-to-10 bit conversion.

(3) Select one column as the starting column in conformity with the starting level $S_0$ or $S_1$ in the diagrams of FIGS. 1 to 10. In the present example, this is the column $k=3$, so that a digital-sum-value variation between $+1$ and $-2$ is possible within the word in conformity with the group $T_0$. An end column is then found by moving a number of columns in conformity with the disparity of the group (In the present case 0).

(4) Enter a 1 at the first row in the column to the right of the end column.

(5) Fill the matrix from top to bottom by adding at every position the sum of the two numbers situated diagonally above said position, with the proviso that always a zero is inserted in the first column and the number diagonally above it in the fourth column is inserted in the auxiliary column. In this way the matrix shown in FIG. 14 is obtained. The numbers in the fifth column have been parenthesized because they have no function once the matrix has been formed. Above the 3rd column (end column) an asterisk has been placed because the encoding and decoding methods to be described hereinafter always terminate at this point. Numbers outside the diagonals which originate from the asterisk and the diagonals which originate from the starting number 55 in the 10th row and the 3rd column neither play a part and have also been parenthesized. The other numbers, which do play a part, may, for example, be stored in a memory.

The encoding method proceeds as follows: the sequence number of the input word is compared with the starting number (55). If this sequence number is higher than or equal to the starting number the starting number is subtracted from it and the vector "1" is followed to the number situated diagonally above it to the right, while a logic one is supplied. If the sequence number is smaller, the method proceeds directly to the next sequence number at the top left, while a logic zero is supplied. This operation is repeated for every following number until eventually the asterisk is reached.

During decoding the method is reversed. Starting is effected at the starting number (55). Upon receipt of a logic one the diagonal to the top right is followed and the number is accumulated; upon receipt of logic zero the diagonal to the top left is followed without said number being accumulated. At every position the same operation is carried out until the asterisk is reached, the number obtained by accumulation constituting the sequence number of the word obtained by decoding. In practice, the binary weight of this word will be chosen as the sequence number, which is effected directly by adding the numbers of the modified Pascal triangle as binary numbers.

FIG. 15 shows a first example to illustrate the operation of the encoding and decoding method. The selected input word is the 8-bit word 00000000 with the decimal sequence number 0. The number 55 cannot be subtracted from this sequence number, so that it is necessary to step to the top left to the number 21, a logic 0 being supplied. The number 21 cannot be subtracted, so that again it is necessary to step to the top left and to supply a logic 0, so that the number 0 is reached. From this number 0 can be subtracted (remainder 0), so that the next step is to the top right and a logic one is supplied; the number 8 at this position cannot be subtracted from the said remainder zero, so that again a step to the top left is made and a logic zero is supplied etc., the path indicated by the arrows being followed towards asterisk. The entire 10-bit output word is then 0010101011, which corresponds to the decimal value 171 (1st word in Table 13).

During decoding starting is a gain effected at 55. A logic zero is received and a step to the top left is made. The following logic zero again necessitates a step to the top left. The next logic one requires a step to the top right and an accumulation of the number situated at the beginning of this step, in the present case zero. The 10-bit word 0010101011 then leads to an 8-bit output word with the sequence number zero=00000000 via the indicated path.

FIG. 16 illustrates the use of a modified Pascal triangle for encoding the word 00011101 with the sequence number (=binary weight) 29. Starting is effected at the number 55. This is higher than 29, so that a step is made to the top left to the number 21 and a zero is supplied. The number 21 is smaller, so that a step to the top right is made and a logic one is supplied, the number 21 being subtracted which yields 29−21=8. The next number (21) is higher, so that a logic zero is supplied and a step is made to the top left. The number then found (8) can be subtracted, so that zero remains. Then a step to the top right is made and a logic one is supplied. The method proceeds in this way until the asterisk is reached. The complete output word is then 0101001011 (331 in the table of FIG. 13).

The 10-bit word 0101001011 is decoded as follows. The first bit is zero, so that a step to the top left is made; the second bit is 1, so that a step is made from this position with the number 21 to the top right and this number 21 is accumulated. The following bit is again zero, so that a step to the top left is made to the number 8, from which under command of the fourth bit (which is a logic one) a step to the top right is made, said number 8 being accumulated. Finally, the asterisk is reached with the number 29=00011101 in the accumulator.

FIG. 17 shows how the 8-bit word 00010100=20 is encoded into the 10-bit word 0011101010=234. Encoding proceeds as follows. The starting word is larger than the input word 00010100=20. A step to the top left is made and a logic zero is supplied. The number 21 then reached is also higher than 20. Again a logic zero is supplied and a step to the top left is made, where a zero is found. This number zero can be subtracted from the number 20 and with the remainder 20−0=20 a step to the top right is made and a logic one is supplied. From this position, a logic one and with the remainder 20−8=12, a step to the top right is made and another step with the remainder 12−8=4. The number now reached is 5, which is higher than 4, so that a step to the top left is made and a logic zero is supplied, yielding the number 3 which can be subtracted from 4, after which, which the remainder 4−3=1, a step to the top right to the number 2 is made and a logic one is supplied. This number 2 cannot be subtracted from the remainder 1, so that a logic zero is supplied and a step to the top left is made to the number 1, which can be subtracted from 1, so that again a logic one is supplied and with the remainder 1−1=0 a step to the top right is made, where the higher number 1 initiates the last step towards the asterisk, a logic zero being supplied. Thus, the output word 0011101010=234 (in conformity with the table of FIG. 13) is formed from the input word 00010100=20. During decoding the same path is followed under accumulation of the numbers 0, 0, 8, 8, 3 and 1, yielding 20=00010100.

The foregoing demonstrates that this method can never lead to words with an instantaneous digital-sum-value variation beyond the specified limits. Indeed, when the first column is reached, this is always followed by a step to the top right, because zero can always be subtracted from the instantaneous remainder. The fourth column always leads to a step to the top left, which is easy to seen when it is assumed that the instantaneous remainder would necessitate a step to the top right. The remainder would then be larger than or equal to a previous number, so that the fourth column would not be reached. Assume, for example, that in the fourth column, 3rd row the number 2 is reached. A step to the top right would require a remainder of 3 or higher. However, this cannot be achieved by a step from the 4th row, 3rd column (number 3) to the top right.

A similar assumption for row 5, column four would require a remainder higher than or equal to 5. However, this would mean that at the 6th row, 2nd column the remainder would have been higher than 8+8+5=21, which at this position would have meant a step to the top right instead of to the top left.

The fact that an uninterrupted series of numbers, in the present example ranging from zero to 88 can be encoded in this way is each to verify by trying out all the possibilities.

FIG. 18 illustrates how a modified Pascal triangle for decoding the group $T_1$ is obtained. Here, the initial state $S_1$ has been selected. The group having the initial state $S_0$ is then obtained by reversal plus inversion. The digital-sum-value variation within the word is then +1 and −4, so that six columns are required, using the 5th column as the starting column. Had the reverse situation been selected, i.e. initial state $S_0$, the variation would be between +3 and −2, so that again six columns would be required with the third column as the starting column. The disparity from $S_1$ is −2, so that the third column is found as the end column (see asterisk) (in the complementary case the 5th column would be found as the end column). Thus, in the fourth column, first row the number one is entered and a zero at any other relevant position in said row. Further, the matrix is filled in accordance with the rules, the non-relevant numbers being parenthesized (and being omitted in FIG. 19).

FIG. 19 shows how the number 01000110=70 is decoded and how the result is encoded. Encoding starts in the 5th column with the number 108. This cannot be subtracted from 70, so that a step to the top left is made and a logic zero is supplied, upon which the number 61 is reached. This number can be subtracted from 70, so that the remainer 70−61=9 a step to the top right is made and a logic one is supplied, yielding the number 33 which cannot be subtracted from said remainder 9, as result of which a logic zero is supplied and a step is made to the top left to 19 and thence to 9 at the sixth rolw. This number can be subtracted, so that with the remainder 9−9=0 a step to the top right is made to the number 6 and a logic one is supplied. This number cannot be substracted from the remainder zero, so that a logic one is supplied and a step to the top left is made, which is repeated twice (a logic zero being supplied each time) until zero is reached at the second row, which can be subtracted from zero yielding a remainder zero with which a step is made to the asterisk while a logic one is supplied. In this way the word 0100100011=291 is found. Decoding is again effected in conformity with the rules along the path indicated by the arrows. Accumulation of the numbers from which steps to the top right are made (upon receipt of a logic one) than yields the number 61+9+0+0=70. This pair of number 70 and 291 cannot be found in the table of FIG. 13 because the sequence numbers 0 to 88 belong to the group $T_0$ and are encoded and decoded in conformity with the modified Pascal triangle of FIG. 14. The sequence numbers of the group $T_1$ are obtained by adding 89 to the binary weight, so that the binary number 70 corresponds to the sequence number 70+89=159 in the table. Another possibility is to increment all the numbers on the diagonal which extends from the number 108 to the top left by 89 in the memory in which the Pascal triangle of FIG. 8 is stored, so that automatically one additional accumulation of the number 89 is effected during decoding, namely when the first step to the top right is made (not later than the fifth bit), while during encoding, the number 89 is additionally subtracted once.

In principle, it is possible to increment all the numbers in the triangle by a specific amount because all the words contain an equal number of ones. The lexicographical value multiplied by the number of ones is then incremented by said amount. This incrementation may be effected diagonally, because one step to the right is made for each diagonal. The number of diagonals which extend to the top left, including the diagonal which terminates at the asterisk, corresponds to the number of ones. This incrementation need not be applied to the numbers in the last column because no step to the top right is made from this column. This alternative may be used only for decoding the code words. During encoding it is only allowed to increment said diagonal which originates from the starting point!.

In this respect, it is denoted that in the Schalkwijk reference using the unmodified Pascal triangle, always the difference between two diagonally situated numbers of the Pascal triangle is taken instead of the number from which a step is made, the operation being terminated at the number one at the apex of the triangle instead of at the asterisk. This corresponds to a displacement of all the elements of the matrix over one row and one column. Indeed, said difference is always situated to the top left of the relevant number.

Figure 20:
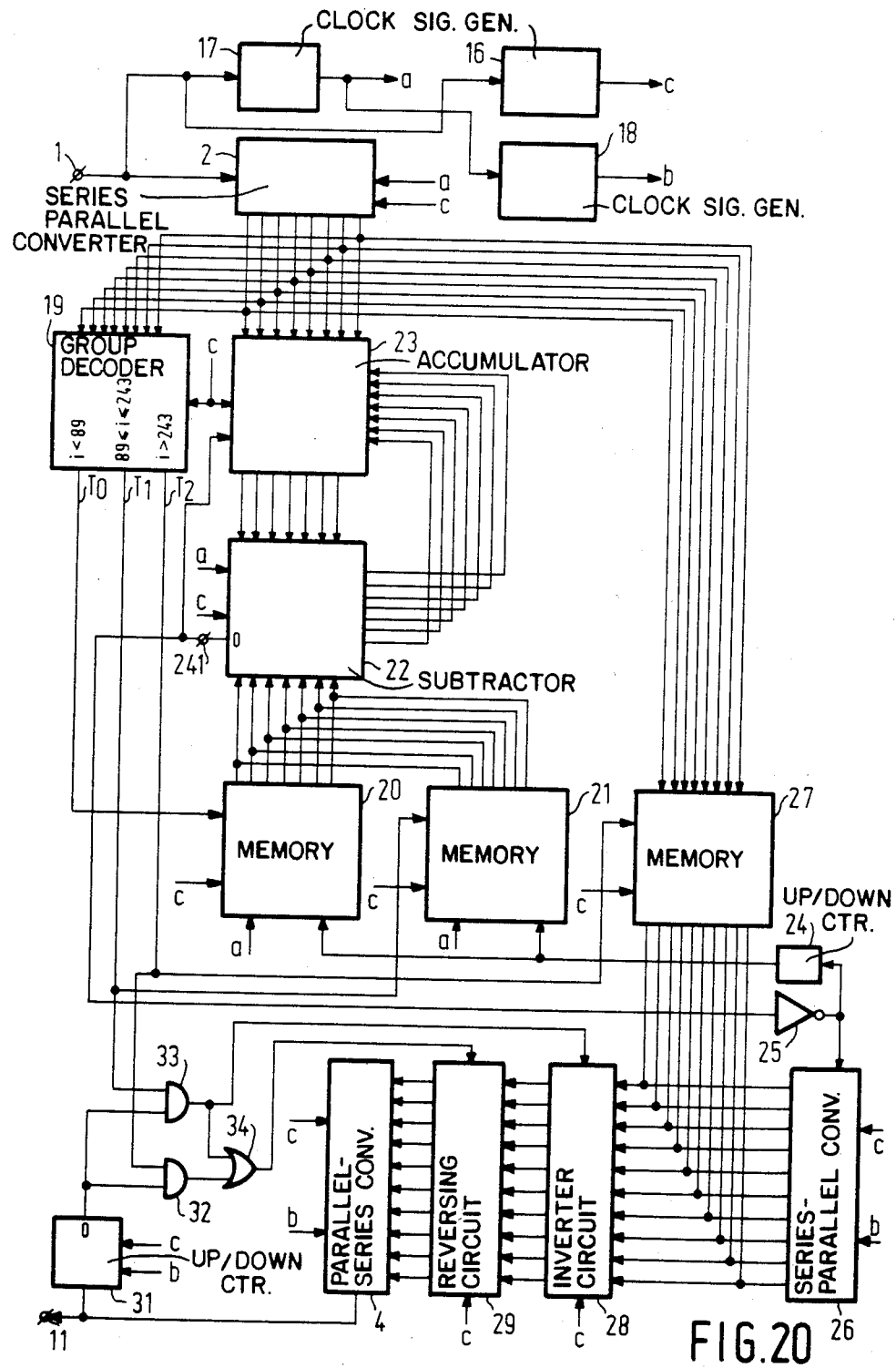
FIG. 20 shows an example of an encoding circuit employing the principles described with reference to FIGS. 14 to 19.

FIG. 20 shows an example of an encoding circuit which employs the principles described with reference to the foregoing Figures. A serial 8-bit signal on input 1 is converted into a 8-bit parallel signal by means of a series-to-parallel converter 2. Further, a word-synchronous clock signal c is generated by means of a clock signal generator 16 and an 8-bit synchronous clock signal a is generated by means of a clock-signal generator 17. Further, a clock signal b which is in synchronism with the bit frequency of the output signal to be formed, i.e. a frequency which is 10/8 times the frequency of the clock signals a, is formed by means of the clock-signal generator 18, which clock signals are applied to the various parts of the encoding circuit for synchronizing purposes. The 8-bit output of the series-to-parallel converter 2 is connected to a group-decoder circuit 19 which generates a signal $T_0$, $T_1$ or $T_2$, for example by means of logic gates, when the binary weight i of the 8-bit word complies with $i<89$; $89 \leq i \leq 243$, and $i>243$ respectively; these are the three previously defined groups of input words which are each encoded in a separate manner. The arrangement further comprises a memory 20 which is switched on by the signal $T_0$ and which contains the modified Pascal triangle shown in FIG. 14, which memory is arranged in parallel with a memory 21 which can be switched on by the signal $T_1$ and which contains the modified Pascal triangle shown in FIG. 18. The outputs of the two memories are connected to a subtractor circuit 22, which subtracts the number supplied by the memory 20 or 21 from the number supplies by an accumulator 23. The output of the subtractor circuit is also connected to the accumulator 23. The input word received from the series-to-parallel converter 2 is loaded into the accumulator 23 under command of the clock signal c. The memories 20 and 21 are row-addressed by the bit clock signal a, causing a shift by a one row after every bit in such a way that the modified Pascal triangle (FIGS. 14, 18) is stepped through from bottom to top. With respect to the column addressing, the third column of memory 20 (shown in FIG. 14) or the fifth column of memory 21 (shown in FIG. 18) is selected as the starting column under control of the clock signal c. In the subtractor circuit 22, the number read out is subtracted from the number supplied by the accumulator 23 and the remainder is stored in said accumulator 23 if it is higher than or equal to zero, which can be achieved by inhibiting reloading of said accumulator 23 with an overflow signal on an output 241 of the subtractor circuit 22. The overflow signal, which has been inverted by means of the inverter 25 determines the column addresses of the memories via an up/down counter 24 which decrements the column number by one when said overflow signal appears (or the number in the memory cannot be subtracted) and which increments the column number by one if this signal does not occur (or the number in the memory can be subtracted from the number in the accumulator). The inverted overflow signal then also constitutes the desired output signal. Indeed, this number is a logic one when the number can be subtracted from the number in the accumulator 23 and a logic zero when the number cannot be subtracted. When group $T_1$ is processed, the initial sequence number may be subtracted when the input signal is loaded into the accumulator 23 under command of the signal $T_1$ or allowance may be made for this in the numbers contained in the memory 21 (in a manner as described with reference to FIG. 19).

By means of the series-to-parallel converter 26, the inverted overflow signal is converted into a 10-bit parallel signal (using the clock signal b).

The apparatus further comprises a memory circuit 27 which receives the 8-bit parallel input word from the series-to-parallel converter 2, which is energized by the signal $T_2$, and which contains the code words of said third group $T_2$, so that under command of the signal $T_2$, the 10-bit code words of the third group are generated as a function of the relevant 8-bit input words. Said 10-bit words, which are available in parallel form, are applied to the output of the series-to-parallel converter 26 via a wired-OR, so that on this output all the 10-bit code words appear in the rhythm of the 8-bit input words but all encoded in conformity with the initial state $S_1$. Via a switchable inverting gate circuit 28 and a switchable reversing gate circuit 29, these 10-bit words are applied to the parallel-to-series converter 4, which supplies the encoded bit stream on output 11. By means of an up/down counter 31, which is word-synchronized via the clock signal c, the digital sum value of all the preceding words is integrated. If this digital sum value for all the preceding words is zero, the initial state $S_0$ is valid, while encoding has been effected in the initial state $S_1$. In that case the next word, if this is a word from group $T_1$, should be inverted and reversed and, if it is a word from group $T_2$, it should be reversed only. For this purpose the output signal of said up/down counter 31 is logically combined with the signals $T_1$ and $T_2$ via gates 32, 33 and 34 to obtain signals which energize the inverting circuit 28 and/or the reversing circuit 29 in the said cases.

Figure 21:
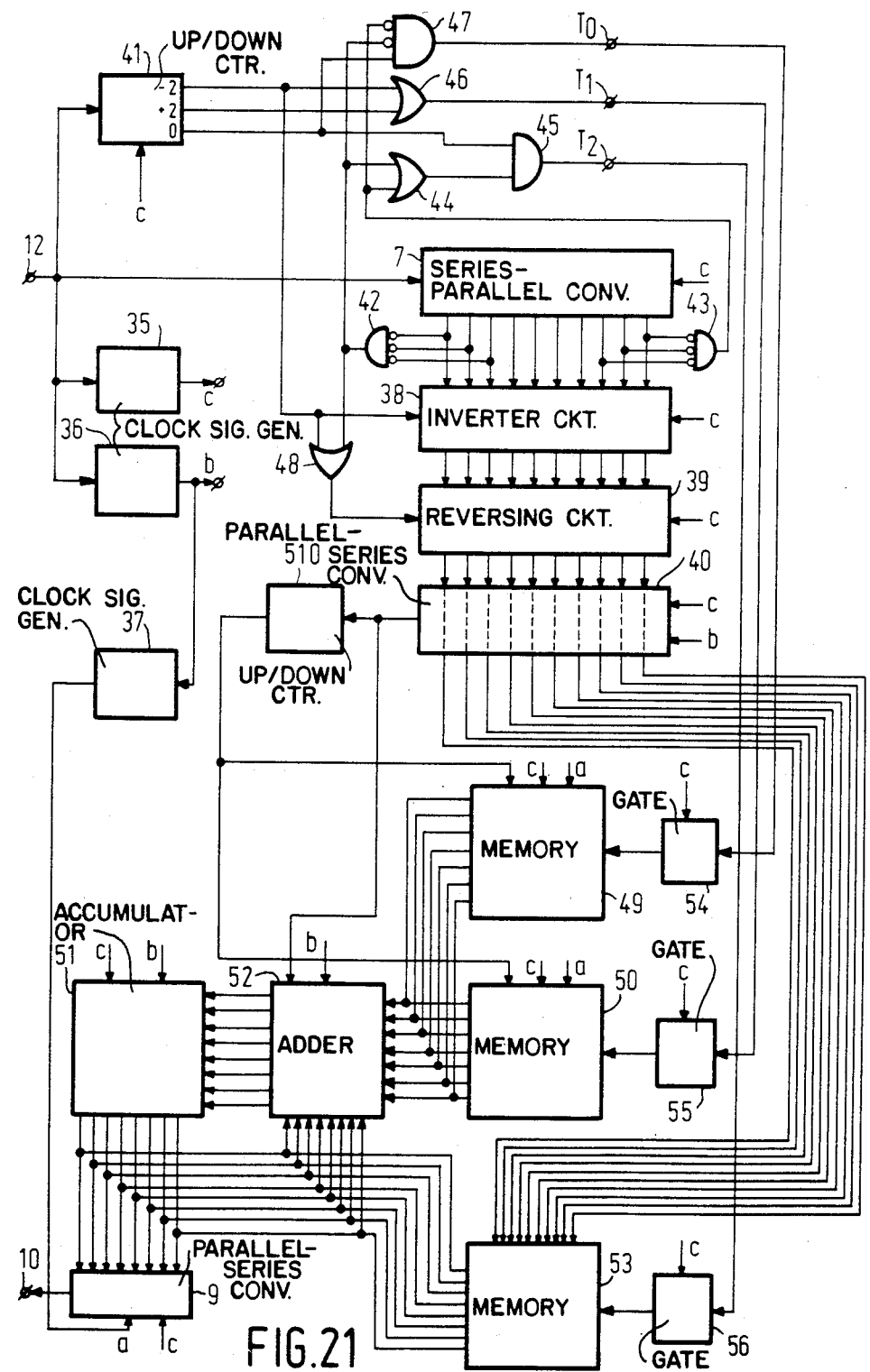
FIG. 21 shows an example of a decoding circuit employing the principles described with reference to FIGS. 14 to 19.

FIG. 21 shows a decoding circuit for decoding 10-bit words which have been encoded by means of the encoding circuit shown in FIG. 20. Via an input 12, the 10-bit words are applied to the series-to-parallel converter 7 as a serial bit stream to be converted into a 10-bit parallel bit stream. By means of clock-generator circuits 35, 36 and 37, the clock signals c, b and a, respectively, are generated, which signals are synchronous with the word frequency, the bit frequency of the 10-bit words, and the bit frequency of the 8-bit words, respectively.

It is necessary to determine whether each word of the incoming bit series has been encoded in the state $S_0$ or $S_1$ and to which of the groups $T_0$, $T_1$ or $T_2$ it belongs. For this purpose the 10-bit words are applied to an up/down counter 41, which is synchronized by the word-clock signal c and at the end of every word indicates the disparity (the digital-sum-value variation within said word). This may be $-2$, $+2$ or 0. The three least significant bits of the output signal of the series-to-parallel converter 7 are monitored by the AND-gate 42 and the three most significant bits are monitored by the AND-gate 43, both gates having inverting inputs which supply a signal when the relevant bits are zero, i.e. in the state $S_0$ and $S_1$, respectively, in the case of a word of group $T_2$.

If the counter 41 has detected zero disparity and either gate 42 or gate 41 supplies an output signal, the word belongs to group $T_2$. For this purpose, the output signals of gates 42 and 43 are combined in the OR-gate 44 and the output signal of this OR-gate is combined with the 0-disparity output signal of the counter 41 in AND-gate 45 to form a signal which identifies a word of group $T_2$. OR-gate 46 combines the $+2$ disparity output signal of counter 41 and the $-2$ disparity output signal to form a signal which identifies a word of group $T_1$, which words have a disparity of $\pm 2$. The 0 disparity signal from counter 41 is an indicative of the group $T_0$ when gates 42 and 43 do not supply an output signal, which is detected by means of gate 47, which consequently supplies a signal which identifies a word of group $T_0$.

In the same way as the encoding circuit shown in FIG. 20, the decoding circuit shown in FIG. 21 starts from the state $S_1$ and words in the state $S_1$ are converted by inversion and/or reversal. Words of group $T_1$ in the state $S_0$ can be identified in that they have $-2$ disparity, so that in the case of $-2$ disparity, it is necessary to invert and reverse. Words of group $T_2$ in the state $S_0$ can be identified from the fact that the three least significant bits are zero, i.e. from the fact that gate 42 supplies an output signal.

In order to convert words of the state $S_0$ to words of the state $S_1$, the output signal of the series-to-parallel converter 7 is applied to a switchable reversing circuit 39 via a switchable inverter circuit 38. The inverter circuit 38 is switched on by the $-2$ disparity signal from counter 42 and the reversing circuit 39 by a signal formed by combining this $-2$ disparity signal and the gate 42 output signal by means of OR-gate 48, synchronization being effected by means of the word clock signal C.

In order to decode the words thus obtained, the circuit shown in FIG. 21 comprises a memory 49 which stores the modified Pascal triangle shown in FIG. 14, which is switched on by means of the signal $T_0$ and which is arranged in parallel with the memory circuit 50 which stores the modified Pascal triangle shown in FIG. 8 and which is switched on by the signal $T_1$.

The memory circuits 49 and 50 are row-addressed by the bit-clock signal b in such a way that at the beginning of the word, starting is effected at a row which corresponds to the 10th row of the Pascal triangle, which row is stepped through from bottom to top. These memory circuits are column-addressed by an up/down counter 510 which receives the 10-bit words via a parallel-to-series converter 40 and consequently generates the instantaneous digital sum value within the word, in such a way that starting is effected in the specified starting column, i.e. the third column for the memory 49 and the fifth column for the memory 50, to proceed to a column of higher sequence number after every logic one. Simultaneously, under command of the bit clock a start to a higher row is effected so that a step to the top right in the modified Pascal triangle is made in the same way as described with reference to FIGS. 14 to 19. Similarly, a logic zero results in a step to the top left. In accordance with the decoding method, the numbers in the modified Pascal triangle must be accumulated when a logic one occurs in the word. For this purpose the circuit comprises an accumulator 51 and an adder circuit 52, which is controlled by the word on the output of the parallel-to-series converter 40 and, each time that a logic one occurs in said word, adds the contents of the instantaneously addressed memory location to the accumulator contents, synchronized in such a way that the number is read out of the memory before the address is changed under command of the same logic one. In this way the output word is generated as an 8-bit code word in the accumulator 51, which transfers its contents to the parallel-to-series converter 9 at the end of said word and is then reset. The shift over 89 of the words of group $T_1$ may then be effected by, for example, resetting the accumulator 51 to 89 at the end of every word or by adapting the contents of the memory 50.

In order to decode the words of group $T_2$, the words on the output of the reversing circuit 39 are applied in parallel to a memory 53 which is switched on by the signal $T_1$ and which as a function thereof generates the 8-bit words by reading out a table, which words together with the output words of the accumulator 51 are applied to the parallel-to-series converter 9 via a wired OR, after which they are applied to the output 10, said converter being controlled by the clock signals a and c.

Synchronization must be effected by means of the clock signals a, b and c and if required, by means of delay networks and hold circuits. For example, a 10-bit word is subject to a delay of one full word during its processing via the series-to-parallel converter 7, the inverting circuit 38, the reversing circuit 39, and the parallel-to-series converter 40, so that the generated signals $T_0$, $T_1$ and $T_2$ should be transferred via gates 54, 55 and 56 with a delay of one word length.

In the circuits shown in FIGS. 20 and 21, a memory circuit is required for each of the three groups $T_0$, $T_1$ and T₂, which may be undesirable because of the required storage capacity.

In order to avoid the use of the code table for the first group $T_2$ it is then necessary to find a method of extending the number of possible code words of zero disparity within the group $T_0$. In accordance with the table of FIG. 13, 89 code words of zero disparity in the group $T_0$ are used. The number of possibilities of forming a code word of zero disparity within the specified limits is 131 in the state $S_1$ and 197 in the state $S_0$. In order to enable a modified Pascal triangle to be used, it is then useful to start from the situation with the smallest number of possibilities, i.e. the state $S_1$, and when the initial state is $S_0$, to transpose these words into the state $S_1$. All the possibilities in state $S_1$ can then be used, so that a modified Pascal triangle may be used, which requires an uninterrupted series of sequence numbers.

When considering the group $T_0$, it will be seen that only those code words are used whose instantaneous digital sum value lies between +1 and −2 from the beginning of the word. This means that in the state $S_1$, the words which have an instantaneous digital sum value of −3 or −4 are not utilized.

Figure 22:
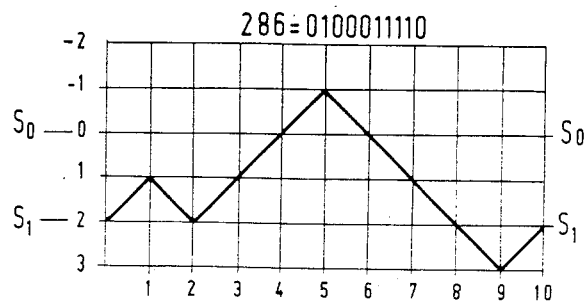
FIGS. 22 to 25 show a number of Trellis diagrams to explain the choice of some of the code words, which have been selected so that it is no longer necessary to store one group of code words in a memory.
Figure 23:
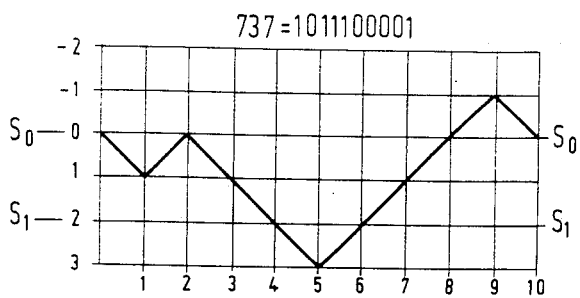

The words with an instantaneous digital sum value of −3, but not those with a value −4, can be mapped to the state $S_0$ by inversion alone. FIG. 22, by way of example, shows the variation of the word 286=0100011110 in the state $S_1$, which word reaches the level −1, i.e. an instantaneous sum value of −3. After inversion, which causes a change to 737=1011100001, it can be mapped to the state $S_0$, as shown in FIG. 23.

Figure 24:
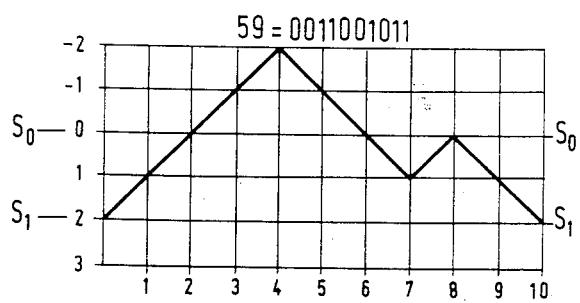
Figure 25:
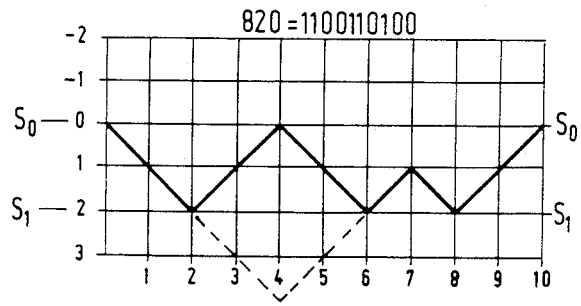

Words having instantaneous digital sum value of −4 cannot be mapped directly to the state $S_0$ because they would reach the impermissible level 4 owing to inversion in the state $S_0$. In this state $S_0$ the levels −2, −1, 0 and +1 occur, as well as the level +3 owing to the inversion described above. Thus, those code words which reach the level +3 without having reached the level +2 are missing. These code words may then be mapped, for example, by "folding" the word about the level +2 after inversion, for example, by an additional inversion of the bits which follow when the +2 level is reached and by applying an additional inversion (in order to cancel the previous inversion) when this level is reached a second time etc. FIG. 24, by way of illustration, shows the word 59=0011001011 which has an instantaneous digital-sum-value variation of −4 in the state $S_1$. This word can be mapped to the state $S_0$ in accordance with the rules described in the foregoing, yielding the word 820=1100110100, as is shown in FIG. 25.

In the manner described, all the possible code words in the state $S_1$ can be used, enabling a modified Pascal triangle having six columns to be used. As a result of this, 131 code words of zero disparity are found. Since also 155 code words of −2 disparity are available, this results in a total of 286 possible code words, while only 256 words are required. The surplus code words may, for example, be skipped without demanding additional storage capacity by skipping them at the beginning or at the end of the sequence-number sequence, for example by starting to encode with the sequence number 19 and 0, respectively.

The group of code words thus found can then be encoded and decoded by means of a modified Pascal triangle having six columns. Since for the encoding and decoding of the group $T_1$ also a modified Pascal triangle having six columns is required, it is effective to combine the two, which is found to be possible when two end columns are employed. In that case a starting column is selected (5th column corresponding to the state $S_1$; see also FIG. 18 and the description), an end column for words of zero disparity, i.e. the fifth column, and an end column for words of −2 disparity, i.e. the third column. In conformity with the rule that at the first row the number one should be entered in the column to the right of the end column marked with an asterisk, the number one is now entered at the right of the two end columns, i.e. in the columns 4 and 6, and further the matrix is filled in accordance with the rules described with reference to FIGS. 14 to 19. This yields the matrix of FIG. 26 in which the non-relevant numbers are parenthesized and the positions which are not relevant because the matrix is stepped through diagonally are left blank.

FIG. 27 illustrates the encoding and the decoding of the 8-bit word 15=00001111 into the 10-bit word 77=0001001101, which is a word of −2 disparity, and vice versa and FIG. 28 illustrates the encoding and the decoding of the 8-bit word 17=00010001 into the 10-bit word 79=0001001111, which is a word of zero disparity, and vice versa, in conformity with the encoding and decoding rules described with reference to FIGS. 14 to 19.

Figure 29:
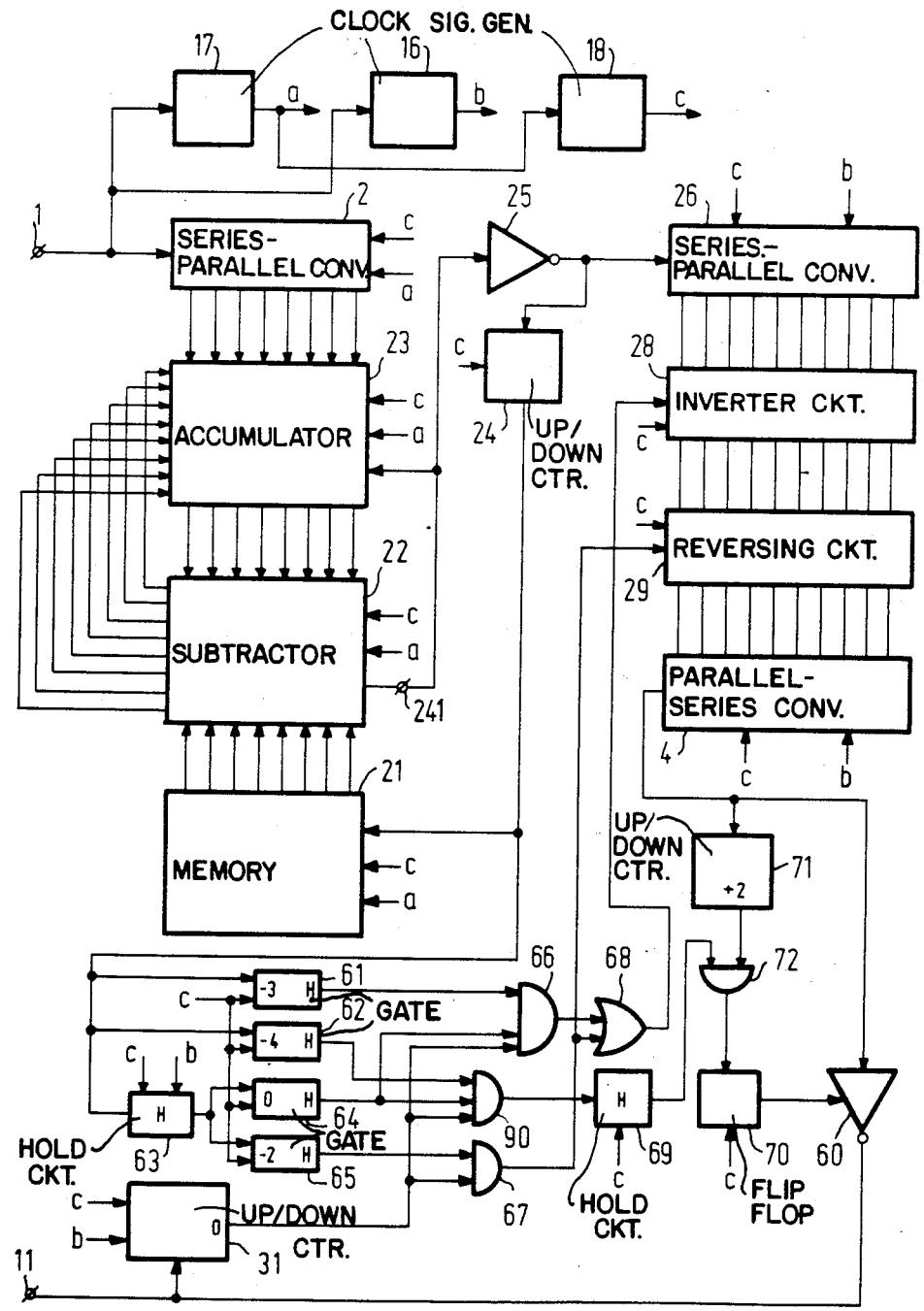
FIG. 29 shows an example of an encoding circuit based on the modified Pascal triangle shown in FIG. 26.

FIG. 29 shows an example of an encoding circuit based on the modified Pascal triangle of FIG. 26. Its principle corresponds to that of the circuit of FIG. 20 but in the present example only one memory 21, in which the modified Pascal triangle of FIG. 26 is stored, is used which is employed in conformity with FIG. 26, in which the inverting circuit 28 and the reversing circuit 29 are controlled differently as a function of the code words, and in which an inverter 60 is arranged between the parallel-to-series converter 4 and the output 11 in order to effect the "folding" about 2 described with reference to FIG. 25.

The generated code word which becomes available as the overflow signal of the subtractor circuit 22 after inversion with the inverter 25 is applied to the up/down counter 24 to control the column addressing of the memory 22. The output signal is also applied to gate circuits with a latching function (flip-flops) 61 and 62, which detect whether said up/down counter 24 is in a −3 state or a −4 state, respectively. This output signal is also applied to a hold circuit 63 in order to hold the state of the counter 24 at the end of the word (the disparity). The disparity is detected by gates 64 and 65, with a latching function, which detect the states 0 and −2. In addition, in the same way as in the example of FIG. 20, the initial state ($S_0$ or $S_1$) is detected by means of the up/down counter 31. By means of AND-gate 66, the output signals of the gates 61 and 64 and counter 31 are combined, which AND-gate therefore supplies an output signal which is indicative of a word which has reached or passed the level −3 while the disparity of this word is 0 and the state $S_0$. Such a word should then be inverted. The signals from the gate 65 and the counter 31 are combined by means of the AND-gate 67 which supplies a signal which is indicative of words of −2 disparity in the state $S_0$, i.e. words which must be inverted and reversed. For this purpose the output signal of gate 67 is applied to the reversing circuit 29 and, after combination with the output signal of gate 66 by means of an OR-gate 68, also to the inverting circuit 28. The signals from gates 62 and 64 and from the counter 31 are combined by means of an AND-gate 90. This AND-gate 90 supplies a signal which is indicative of words of zero disparity which reach the level −4 while the initial state is $S_0$. These words have to be folded about +2. This can be effected by means of the inverter 60. However, after parallel-to-series conversion in the converter 4 the bit series has a delay of one word length relative to the bit series on the input of converter 26. Therefore, the signal from gate 90 is delayed by one word length with the hold circuit 69. The digital-sum-value variation within each word of the output signal of the converter 4 is determined by means of an up/down counter 71 and each time that the level +2 is reached, a signal is supplied. In AND-gate 72, this signal is combined with the output signal of the hold circuit 69. This AND-gate 72 controls a flip-flop 70 which changes over each time that the −2 level is reached during a word to be folded. This flip-flop controls the inverter 60, to obtain the desired folding about +2.

Figure 30:
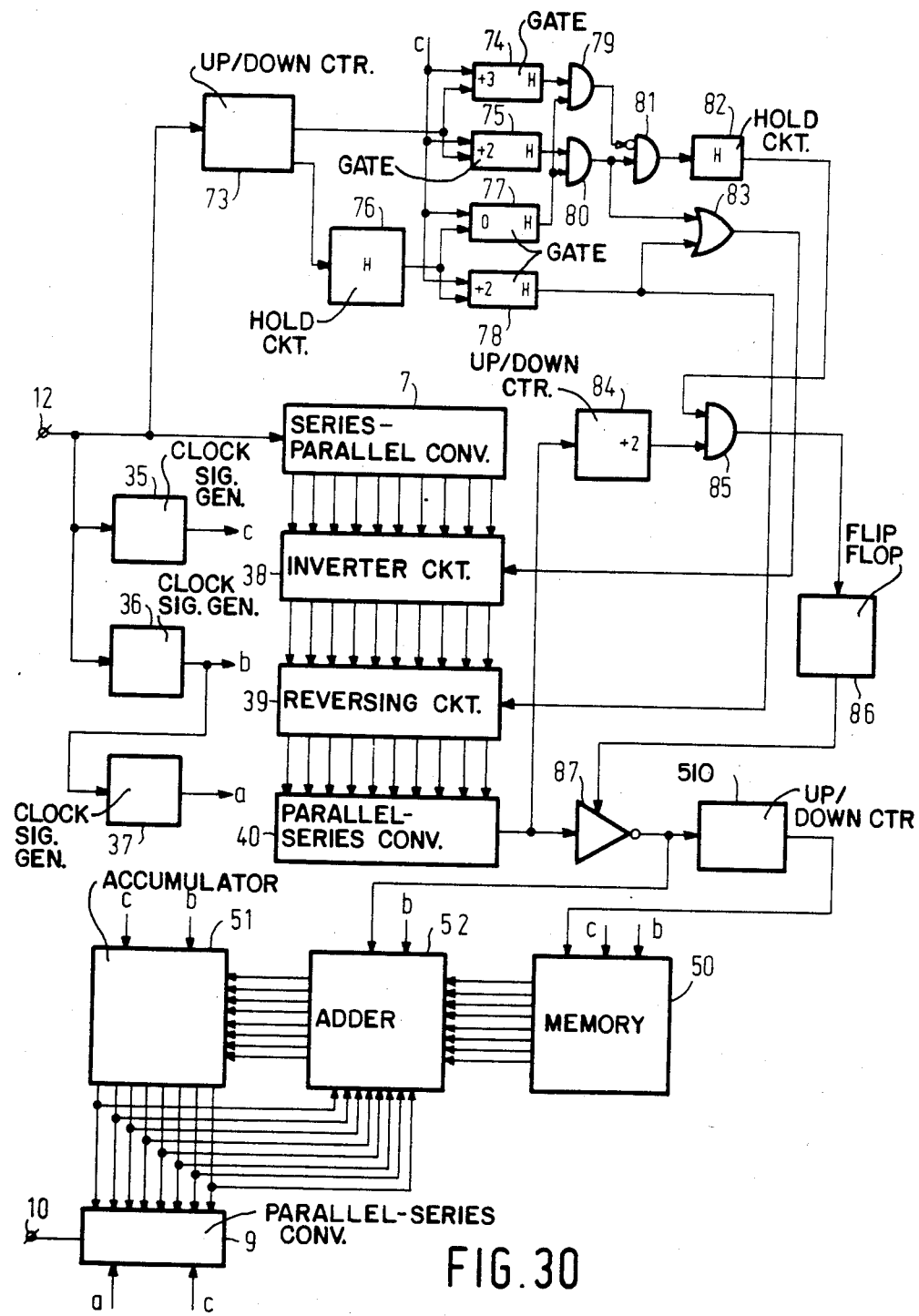
FIG. 30 shows an example of a decoding circuit based on the modified Pascal triangle shown in FIG. 26.

FIG. 30 shows an example of a decoder circuit for decoding words which have been encoded by means of the circuit shown in FIG. 29. The principle of this encoding circuit corresponds to that of the circuit shown in FIG. 21 but now only one memory circuit 50 is employed which stores the modified Pascal triangle shown in FIG. 26 and the inverting circuit and the reversing circuit are controlled differently as a function of the input signal.

The input signal is applied to an up/down counter 73. The output signal of this counter 73 is applied to gates 74 and 75 with hold functions in order to detect the counts +2 and +3, and also to a hold circuit 76 which holds the final count 73 of said counter at the end of every word, the gates 77 and 78, which have hold functions, detecting whether this final count is zero and +2, respectively. The output signals of gates 74 and 77 are combined in AND-gate 79, yielding a signal which is indicative of words of zero disparity which reach the +3 level. The output signals of gates 75 and 77 are combined by means of the AND-gate 80. This gate 80 supplies a signal which is indicative of words of zero disparity which reach or pass the +2 level, i.e. words which have been inverted only or which have been inverted and folded. This signal is combined with the inverted output signal of gate 79 in AND-gate 81, which then supplies a signal which is indicative of words which have been folded about +2, which signal is applied to hold circuit 82 to be held for one word length. The output signal of gate 78 is indicative of words of +2 disparity, i.e. words which have been inverted and reversed. This signal is applied to the reversing circuit 39 and, after having been combined with the output signal of gate 80 by means of OR-gate 83, to the inverting circuit 38.

The output signal of the series-to-parallel converter 40 is monitored by means of the up/down counter 84 to supply a signal each time that the count +2 is reached within a word, which output signal is combined with the signal from the hold circuit 82 by means of the AND-gate 85 and is subsequently applied to the flip-flop 86 which changes over an inverter 87 arranged between the converter 40 and the adder 52.

With respect to the arrangement shown in FIGS. 20, 21, 29 and 30, it is to be noted that in practice, the encoding circuit (FIG. 20 or 29) can be combined to a large extent with the decoding circuit (FIG. 21 or 30) because these circuits comprise many identical components.

As regards the generation of the word-synchronizing signal c (generator 35 in FIGS. 21 and 30), it is to be noted that steps may be taken to ensure that this signal remains in phase with the data words by adding synchronizing words which are unique within the sequence of code words and which cannot be derived from adjoining parts of consecutive code words. For this purpose it may be necessary, for example in the Table shown in FIG. 12, to inhibit a number of code words. For this purpose the table of FIG. 31 shows those information words (i) of the table of FIG. 13 which have been modified to enable the use of the synchronizing words 0100111110 and 0000111110.

What is claimed is:

1. A method of encoding n-bit information words belonging at least to a first group, into m-bit code words belonging to a first group, where m > n, within which code words the variation of the digital sum value of said code words relative to the initial value of the digital sum value of said code words is limited to a value corresponding to the variation of a first binary value over p bits and a value corresponding to the variation of a second binary value over q bits, where $p \geq 0$ and $q \geq 0$, and which code words exhibit a disparity d, d being an integer within the limits defined by p and q, characterized in that said code words are found by the use of a series of encoding numbers which correspond unambiguously to the information words of the first group, and of numbers $x_{k,r}$ which can be found by arranging the number in a matrix, k being a sequence number for the columns ranging from 1 to p+q+1 inclusive and r being a sequence number for the rows ranging from 1 to m inclusive, which matrix can be formed by entering the value 1 in the 1st row and the (p+d+2)nd column ($x_{p+2+d,1} = 1$), filling the 1st column with the values 0 ($x_{1,r} = 0$), and adding an auxiliary column with the sequence number p+q+2 and filling said auxiliary column with the value in the column p+q+1 in the row of next lower sequence number ($x_{p+q+2,r} = x_{p+q+1, r-1}$) and filling the other relevant positions with the sum of the values in the adjacent columns in the row of next lower sequence number ($x_{k,r} = x_{k-1, r-1} + x_{k+1, r-1}$) with the proviso that the vacant positions at the first row are assumed to be filled with a value zero, all the values on the diagonal which extends from the number $x_{p+1, m}$ to the number $x_{1, m-p}$ being modifiable by the same constant value, in which starting from a number $x_{k,r}$ with a row sequence number r=m and with a column sequence number k=p+1 and starting from an initial value of an auxiliary number A, which initial value corresponds to the encoding number associated with the information word to be encoded of the first group, said auxiliary number is compared with the number $x_{k,r}$ with the instantaneous row sequence number r and column sequence number k to modify said auxiliary number if said number $x_{k,r}$ is smaller than or equal to the auxiliary number A, by subtracting said number $x_{k,r}$ (A:=A−$x_{k,r}$) and to generate one bit of the second binary value, and to select a following number $x_{k,r}$ with a row sequence number decremented by one (r:=r−1) and a column sequence number incremented by one (k:=k+1), and to leave said auxiliary number unmodified, if said number $x_{k,r}$ is larger than the auxiliary number, to generate one bit of the first binary value and to select a following number $x_{k,r}$ with a row sequence number decremented by one (r:=r−1) and a column sequence number decremented by one (k:=k−1), until finally the row sequence number r=1 is reached, after which a bit of the second binary value is generated if the auxiliary number is zero and a bit of the first binary value if the auxiliary number is one, the m bits generated for each information words constituting the code word.

2. A method as claimed in claim 1, in which n-bit information words belonging to a second group are encoded into m-bit code words belonging to a second group, the variation of the digital sum value of said code words of the second group also being restricted to the limits defined by the integers p and q, which code words exhibit a disparity e which differs from d, e being an integer within the limits defined p and q, characterized in that the information words of the second group also correspond unambiguously to numbers of said series of encoding numbers and the code words belonging to the first and the second group are found by means of said number $x_{k,r}$, with the proviso that the numbers $x_{k,r}$ are found in the manner defined with a value 1 at said first row in the (p+e+2)nd column in addition to a value 1 at the first row in the (p+d+2)nd column.

3. A method as claimed in claim 1 or 2, characterized in that the encoding numbers correspond to the binary values of the associated information words.

4. A method as claimed in claim 1, characterized in that the encoding numbers correspond to the binary values of the associated information words, which encoding numbers are all larger than or equal to a number B, B being an integer larger than zero, all numbers $x_{k,r}$ corresponding to the diagonal of the matrix defined, which diagonal extends from the number $x_{p+1, m}$ to the number $x_{1, m-p}$, have been incremented by an amount B in comparison with the values which are found by filling the matrix in the manner defined, and a second series of encoding numbers is assigned to a second group of n-bit information words to be converted into a second group of m-bit code words in a manner similar to the conversion of the information words of the first group, which encoding numbers corresponds to the binary values of the associated information words of said second group and are all smaller than said number B.

5. A method as claimed in claim 1, characterized in that the encoding numbers correspond to the binary values of the associated information words, which encoding numbers are all larger than or equal to a number B, B being an integer larger than zero, the initial value of the auxiliary member A corresponds to the value of the encoding number associated with the information word to be converted minus the number B, and a second series of encoding numbers is assigned to a second group of n-bit information words to be converted into a second group of m-bit code words in a manner similar to the conversion of the information words of the first group, which encoding numbers correspond to the binary values of the associated information words of said second group and are all smaller than said number B.

6. An apparatus for encoding n-bit information words belonging at least to a first group, into m-bit code words belonging to a first group, where m>n, within which code words the variation of the digital sum value of said code words relative to the initial value of the digital sum value of said code words is limited to a value corresponding to the variation of a first binary value over p bits and a value corresponding to the variation of a second binary value over q bits, where p>0 and q>0, and which code words exhibit a disparity d, d being an integer within the limits defined by p and q, which apparatus comprises an input for receiving n-bit information words belonging at least to a first group, an output for supplying m-bit code words belonging to a first group, and an encoding device for converting said n-bit information words into m-bit code words in such a way that within said code words the variation of the digital sum value of said code words relative to the initial value of the digital sum value of said code words is limited to a value corresponding to the variation of a first binary value over P bits and a value corresponding to the variation of a second binary value over q bits where $p \geq 0$ and $q \geq 0$, and said code words exhibit a disparity d, d being an integer within the limits defined by p and q, characterized in that the encoding device comprises storage means for storing numbers $x_{k,r}$ which can be found by arranging said numbers in the matrix, where k is a sequence number for the columns ranging from 1 to p+q+1, inclusive, and r is a sequence number for the rows ranging from 1 to m, inclusive, which matrix can be formed by entering the value 1 in the 1st row and the (p+d+2)nd column filling the 1st column with the values 0, and adding an auxiliary column with the sequence number p+q+2 and filling said auxiliary column with the value in the column p+q+1 in the row of the next lower sequence number, and filling the other relevant positions with the sum of the values in the adjacent columns in the row of next lower sequence number, with the proviso that the vacant positions at the first row are assumed to be filled with a value zero, all values on the diagonals which extends from the number $x_{p+1,m}$ to the number $x_1$, m—p being modifiable by the same constant value, means for generating an initial value of an auxiliary number A, which initial value corresponds to an encoding number which corresponds unambiguously to the information word to be converted, addressing means for addressing the storage means in order to read out a number $x_{k,r}$, the initial address for encoding every following information word being the address associated with the number $x_{p+1, m}$, comparator means for comparing the auxiliary number with the number $x_{k,r}$ which has been read out, means for generating an output bit of the second binary value if said number $x_{k,r}$ is smaller than or equal to the auxiliary number A and for generating an output bit of the first binary value if said number $x_{k,r}$ is larger than the auxiliary number A, means for decrementing the auxiliary number A by the number $x_{k,r}$ read out each time that said number $x_{k,r}$ is smaller than or equal to said auxiliary number A, means for setting the addressing means in such a way that a following number $x_{k,r}$ with a row sequence number decremented by one and a column sequence number decremented by one is addressed each time that the number $x_{k,r}$ read out is larger than the auxiliary number A and that a following number $x_{k,r}$ with a row sequence number decremented by one and a column sequence number incremented by one is addressed each time that the number $x_{k,r}$ read out is smaller than or equal to the auxiliary number A, and means for supplying the m output bits thus obtained for every n-bit information word to be converted to the output.

7. An apparatus as claimed in claim 6, in which n-bit information words belonging to a second group are encoded into m-bit code words belonging to a second group, the variation of the digital sum value of said code words of the second group also being restricted to the limits defined by the integers p and q, which code words exhibit a disparity d which differs from e, e being an integer within the limits defined by p and q, characterized in that number $x_{k,r}$ stored in the storage means are found in the manner defined, with a value 1 at the first row in the (p+e I 2)nd column in addition to a value 1 at said first row in the (p+d+2)nd column.

8. An apparatus as claimed in claim 6 or 7, characterized in that the means for generating the initial value of the auxiliary number A are adapted to generate said initial value in relation to the binary value of the information word to be converted.

9. An apparatus as claimed in claim 6, characterized in that the means for generating the initial value of the auxiliary number A are adapted to generate said initial value in relation to the binary value of the information word to be converted, which binary values are all larger than or equal to a number B, B being an integer larger than zero, the numbers $x_{k,r}$ in the storage means which correspond to the diagonal of the matrix defined, which diagonal extends from the number $x_{p+1, m}$ to the number $x_{1, m-p}$ is incremented by an amount B in comparison with the values found by filling the matrix in the manner defined, and a second series of encoding numbers is assigned to a second group of n-bit information words to be converted into a second group of m-bit code words in the same way as the conversion of the information words of the first group, which encoding numbers are generated by the means for generating the initial values of the auxiliary number A in relation to the binary values of the information words of the second group, which values are all smaller than said number B, the storage means containing a second group of numbers $x_{k,r}$ which can be found in the manner defined, and the apparatus comprising identification means for detecting whether the information words received belong to the first group or to the second group.

10. An apparatus as claimed in claim 6, characterized in that the means for generating the initial value of the auxiliary number A are adapted to generate said initial value in relation to the binary value of the information word to be converted, which binary values are all larger than or equal to a number B, B being an integer larger than zero, decremented by said number B, a second series of encoding numbers being assigned to a second group of n-bit information words to be converted into a second group of m-bit code words in a manner similar to the conversion of the information words of the first group, and the means for generating said initial value being adapted to generate said initial value in relation to the binary value of the information word received if this word belongs to the second group, which apparatus comprises identification means for detecting whether the information words received belong to the first or to the second group.

11. A method of decoding a m-bit code word belonging at least to a first group, into n-bit information words belonging to a first group, where m>n, within which code words the variation of the digital sum value of said code words relative to the initial value of the digital sum value of said code words is limited to a value corresponding to the variation of a first binary value over p bits and a value corresponding to the variation of a second binary value over q bits, where p≦0 and q≦0, and which code words exhibit a disparity d, d being an integer within the limits defined by p and q, characterized in that the information words correspond unambiguously to a series of decoding numbers, which decoding numbers are derived from the code words to be decoded by means of numbers $x_{k,r}$ which can be found by arranging said numbers in a matrix, k being a sequence number for the columns ranging from 1 to p+q+1, inclusive, and r being a sequence number for the rows ranging from 1 to m, inclusive, which matrix can be formed by entering the value 1 in the 1st row and the (p+d+2)nd column ($x_{p+2+d, 1}=1$), filling the 1st column with the values 0 ($x_{1, r}=0$), and adding an auxiliary column with the sequence number p+q+2 and filling said auxiliary column with the value in the column p+1+1 in the row of next lower sequence number ($x_{p+q+2, r}=x_{p+q+1, r-1}$) and filling the other relevant positions with the sum of the values in the adjacent column in the row of next lower sequence number ($x_{k,r}=x_{k-1, r-1}$) with the proviso that the vacant positions at the first row are assumed to be filled with a value zero, the values on the matrix diagonals which extend towards the row of the next lower sequence number and the column of next lower sequence number being modifiable by the same constant value for each diagonal, the decoding number associated with the code word to be decoded being found, starting from a number $x_{k,r}$ with the row sequence number r=m and the column sequence number k=p+1, by modifying an auxiliary number A of predetermined constant initial value, each time that a bit of the second binary value of the code word to be converted is received, by adding the number $x_{k,r}$ (A:=A+$x_{k,r}$) and selecting a following number $x_{k,r}$ with a row sequence number decremented by one (r:=r−1) and a column sequence number incremented by one (k:=k+1) and each time that a bit of the first binary value of the code word to be converted is received, leaving the auxiliary number unmodified and selecting a following number $x_{k,r}$ with a row sequence number decremented by one (r:=r−1) and a column sequence number decremented by one (k:=k−1), the decoding number being constituted by the remaining auxiliary number after receipt of the entire code word.

12. A method as claimed in claim 11, in which m-bit code words belonging to a second group are decoded into n-bit information words belonging to a second group, the variation of the digital sum value of said code words of the second group being also restricted to the limits defined by the integers p and q, which code words exhibit a disparity e which differ from d, e being an integer within the limits defined by p and q, characterized in that the information words of the second group also correspond unambiguously to numbers of said series of decoding numbers and for generating an information word in the manner defined when a code word of the first or the second group is received use is made of said numbers $x_{k,r}$, with the proviso that the numbers $x_{k,r}$ are found in the manner defined, with a value 1 at said first row in the (p+e+2)nd column in addition to a value 1 at said first row in the (p+d+2)nd column.

13. A method as claimed in claim 11 or 12, characterized in that the decoding numbers correspond to the binary values of the associated information words.

14. A method as claimed in claim 11, characterized in that the decoding numbers correspond to the binary values of the associated information words, which decoding numbers are all larger than or equal to a number B, B being an integer larger than zero, all numbers $x_{k,r}$ on one or more of the diagonals of the matrix defined which extend towards the row of next lower sequence number and the column of next lower sequence number, from the diagonal which extends via the number $x_{p+1, m}$ up to and including the diagonal which extends via the number $x_{p+d+1}$, are incremented by such an amount in comparison with the value which found by filling the matrix in the manner defined that the sum of the diagonally applied increments is equal to the number B, and that a second series of decoding numbers is assigned to a second group of m-bit code words to be converted into a second group of n-bit information words in a manner similar to the conversion of the code words of the first group, which decoding numbers correspond to the binary values of the associated information words of said second group and are all smaller than said number B.

15. A method as claimed in claim 11, characterized in that the decoding numbers correspond to the binary values of the associated information words, which decoding numbers are all larger than or equal to a number B, B being an integer larger than zero, said auxiliary number which remains after the entire code word to be converted has been received is incremented by an amount B to generate the associated decoding number, and a second series of decoding numbers is assigned to a second group of n-bit information words to be obtained by decoding a second group of m-bit code words in a manner similar to the decoding of the code words in the first group, which decoding numbers correspond to the binary values of the associated information words of said second group and are all smaller than said number B.

16. An apparatus for decoding an m-bit code word belonging at least to a first group, into n-bit information words belonging to a first group, where $m > n$, within which code words the variation of the digital sum value of said code words relative to the initial value of the digital sum value of said code words is limited to a value corresponding to the variation of a first binary value over p bits and a value corresponding to the variation of a second binary value over q bits, where $p > 0$ and $q > 0$, and which code words exhibit a disparity d, d being an integer within the limits defined by p and q, which apparatus comprises an input for receiving m-bit code words belonging at least to a first group, an output for a supplying n-bit information words belonging to a first group, and a decoding device for converting said m-bit code words into n-bit information words, with which code words the variation of the digital sum value of said code words relative to the initial value of the digital sum value of said words is limited to a value corresponding to the variation of a first binary value over p bits and value corresponding to the variation of a second binary value over q bits, where $p \geq 0$ and $q \geq 0$, and which code words exhibit a disparity d, d being an integer within the limits defined by p and q, characterized in that the decoding device comprises storage means for the storage of numbers $x_{k,r}$, which can be found by arranging said number in a matrix, where k is a sequence number for the columns ranging from 1 to $p+q+1$, inclusive, and r is a sequence number for the rows ranging from 1 to m, inclusive, which matrix can be formed by entering the value 1 in the 1st row and the $(p+d+2)$nd column, filling the 1st column with the values 0 and adding an auxiliary column with the sequence number $p+q+2$ and filling said auxiliary column with the column $p+q+1$ in the row of next lower sequence number and filling the other relevant positions with the sum of the values in the adjacent columns in the row of next lower sequence number, with the proviso that the vacant positions at the first row are assumed to be filled with a value zero, the numbers on the matrix diagonals which extend towards the row of next lower sequence number and the column of next lower sequence number being modifiable by the same constant value for each diagonal, means for generating an initial value of an auxiliary number A, addressing means for addressing the storage means in order to read out a number $x_{k,r}$ using the address associated with the number $x_{p+1, m}$ as the initial address for decoding every following code word, means for incrementing the auxiliary number A by the number $x_{k,r}$ read out each time that bit of the second binary value is received, means for setting the addressing means in such a way that a following number $x_{k,r}$ with a row sequence number decremented by one and a column sequence number decremented by one is addressed each time that a bit of the first binary value is received, in such a way that a following number $x_{k,r}$ with a row sequence number decremented by one and a column sequence number incremented by one is addressed each time that a bit of the second binary value is received, and means for supplying an information word each time that a code word is received, in such a way that an information word is assigned unambiguously to each final value of the auxiliary number.

17. An apparatus as claimed in claim 16, in which m-bit code words belonging to a second group are encoded into n-bit information words belonging to a second group, the variation of the digital sum value of said code words of the second group being also restricted to the limits defined by the integers p and q, which code words exhibit a disparity e which differs from d, e being an integer within the limits defined by p and q, characterized in that the numbers $x_{k,r}$ stored in the storage means are found in the manner defined, with a value 1 at the first row in the $(p+e+2)$nd column in addition to a value 1 at said first row in the $(p+d+2)$nd column.

18. An apparatus as claimed in claim 16 or 17, characterized in that the means for supplying the information words A are adapted to generate information words of a binary value corresponding to the said final value.

19. An apparatus as claimed in claim 16, characterized in that the means for supplying the information words are adapted to generate information words of the second group with a binary value corresponding to said final value, which binary values are all larger than or equal to a number B, B being an integer larger than zero, for which purpose all numbers $x_{k,r}$ on one or more diagonals of the matrix defined which extend towards the row of next lower sequence number and the column of next lower sequence number, from the diagonal which extends from the number $x_{p+1, m}$ up to and including the diagonal which extends via the number $x_{p+d+1, 0}$ are incremented, relative to the values found by filling the matrix in the manner defined, by such an amount that the sum of the diagonally applied increments is equal to the number B, for generating information words of the first group the storage means contain a second group of numbers $x_{k,r}$ which can be found in the manner defined and the apparatus comprises identification means for detecting whether a code word received must be decoded into an information word of the first group or the second group.

20. An apparatus as claimed in claim 16, characterized in that the means for supplying information words are adapted to supply information words of a second group of a binary value larger than or equal to B, B being an integer larger than zero, said final value is incremented by an amount equal to the number B, and said binary value of the information word to be supplied is selected in conformity with said incremented final value, the first group of information words being supplied in conformity with the non-incremented final value, and the apparatus comprises identification means for detecting whether a code word received must be decoded into an information word of the first group or the second group.

* * * * *